United States Patent [19]

Brouwer et al.

[11] 4,365,921

[45] Dec. 28, 1982

[54] FORKLIFT VEHICLE

[75] Inventors: Gerardus J. Brouwer, Keswick; William Arnold, Sutton West, both of Canada

[73] Assignee: Brouwer Turf Equipment Limited, Keswick, Canada

[21] Appl. No.: 154,567

[22] Filed: May 29, 1980

[30] Foreign Application Priority Data

Jun. 21, 1979 [CA] Canada .................................. 330327

[51] Int. Cl.³ .............................................. B65G 67/04

[52] U.S. Cl. .................................... 414/347; 414/497; 414/631; 187/9 R

[58] Field of Search ............... 414/347, 629, 631, 632, 414/633, 634, 497, 661, 544; 187/9 R, 9 E

[56] References Cited

U.S. PATENT DOCUMENTS

| | | | |
|---|---|---|---|
| 1,148,531 | 8/1915 | Oldham | 414/347 |
| 3,240,008 | 3/1966 | McMullen | 414/631 |
| 3,432,054 | 3/1969 | Ulinski | 414/631 |
| 3,521,780 | 7/1970 | Cook | 414/631 |
| 3,587,883 | 6/1971 | Neely, Jr. | 414/497 |
| 3,710,967 | 1/1973 | Stoytchev et al. | 414/631 |
| 3,893,580 | 7/1975 | Stevens | 414/632 |
| 4,268,210 | 5/1981 | Ferguson et al. | 414/497 |

*Primary Examiner*—Joseph J. Rolla
*Assistant Examiner*—Kenneth Noland
*Attorney, Agent, or Firm*—Rogers, Bereskin & Parr

[57] ABSTRACT

A self propelled forklift vehicle having a frame formed by two spaced parallel longitudinal frame members and a rear transverse frame member. The fork carriage is movable forwardly and rearwardly on the longitudinal frame members, along the path of the machine, and carries a fork tower and forks. The forks can be forced below the vehicle to raise the vehicle up beneath the rear of a trailer for transport. The vehicle's rear wheels, which steer and drive the vehicle, are closely spaced and tiltable from side to side to allow for rough terrain, with the operator seat and motor on opposite sides thereof to balance each other. A manually operated split pulley drive allows creeping of the vehicle at a closely controlled low speed. The fork tines include erectable rollers to support part of the vehicle weight when the forks carry a forwardly extended load, to prevent tipping. A front gate causes discharge of the contents of a pallet onto the ground when the fork carriage is retracted. An automatic centering mechanism returns the rear driving wheels to either front driving or rear driving position as selected by the operator.

35 Claims, 36 Drawing Figures

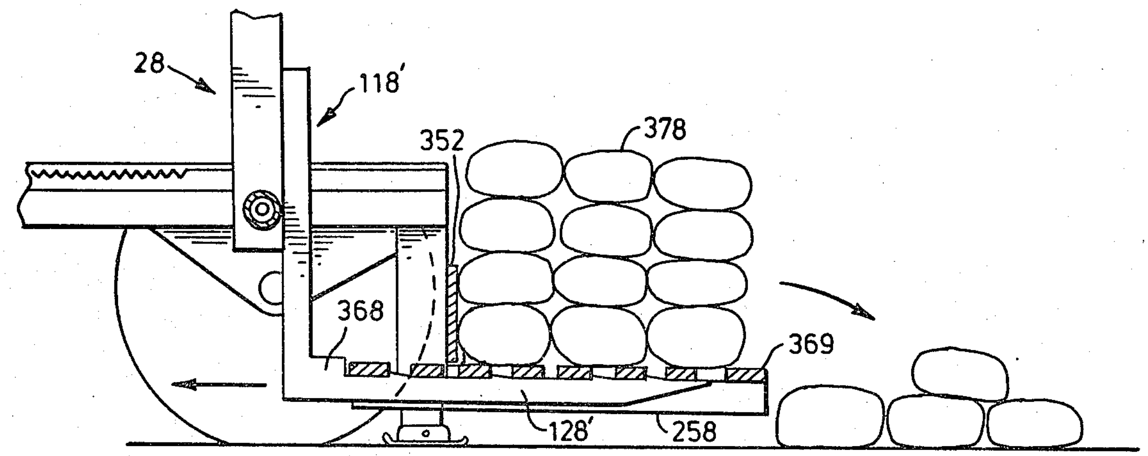
FIG. 26
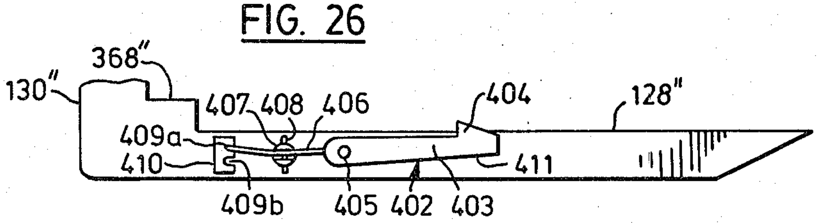
FIG. 29
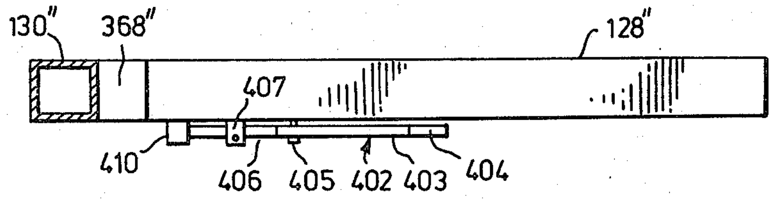
FIG. 30
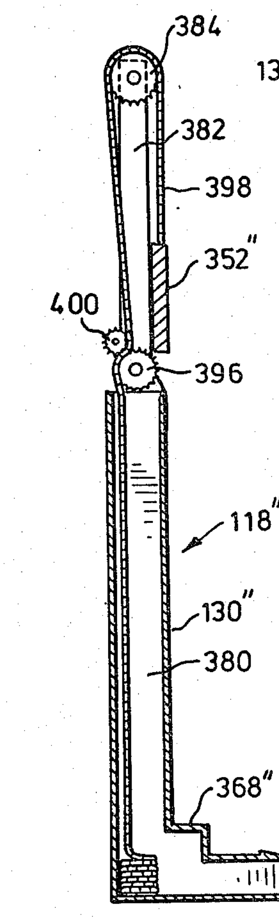
FIG. 27
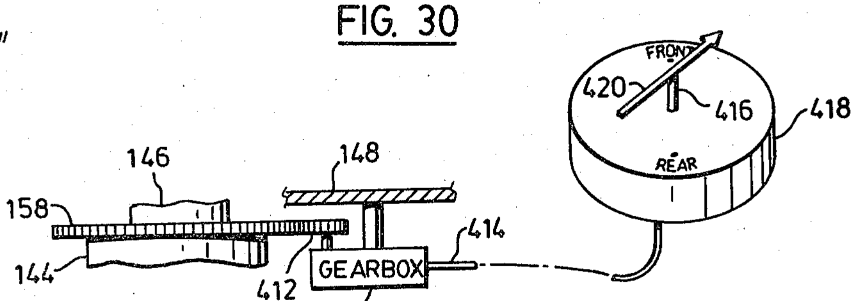
FIG. 31
FIG. 28
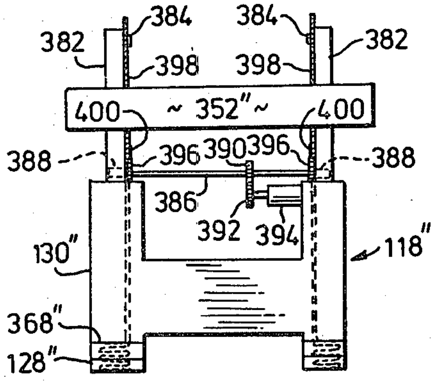
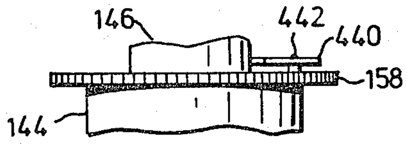
FIG. 33

FORKLIFT VEHICLE

This invention relates to a self propelled forklift vehicle.

Forklift vehicles are commonly used for transporting pallets carrying loads, and for removing the pallets from high surfaces and placing them on lower surfaces or vice versa. Forklift vehicles are normally quite heavy, particularly since they commonly use heavy counterweights to balance the load carried by the forks, and therefore the forklift vehicles cannot easily be transported from one site to another. This is a serious disadvantage in many applications, since forklift vehicles are commonly required for loading and unloading sod, bricks, construction materials and the like at locations where it would be uneconomic to maintain a forklift vehicle present at all times.

Because of the need which has existed for some time for a transportable forklift vehicle, several such vehicles have been developed. One such forklift vehicle is shown in U.S. Pat. No. 3,908,849 to H. F. Carroll. Another such forklift vehicle is shown in U.S. Pat. No. 3,799,399 to T. H. Grether. However the forklift vehicles shown in these patents have various disadvantages. For example, the vehicle shown in the Carroll patent lacks stability under certain conditions and it has inadequate traction in slippery terrain. The forklift vehicle shown in the Grether patent also lacks stability under certain operating conditions and its design has been found to cause difficulties in operation and maintenance.

Therefore, it is an object of the invention to provide a self propelled forklift vehicle which can relatively conveniently be transported from one location to another, and yet which provides improved stability and convenience of operation even when operating over rough terrain such as is commonly found on construction sites. In one of its aspects the invention provides a self propelled forklift vehicle comprising a frame, wheels mounted on said frame for supporting and driving said vehicle, a fork tower mounted on said frame, and forks mounted on said fork tower, means connected between said fork tower and said forks for raising and lowering said forks and for driving said forks substantially below the level of the bottoms of said wheels, whereby to raise said vehicle above the ground.

In still another aspect, the invention provides a self propelled forklift vehicle comprising: a frame, a fork tower mounted on said frame, and forks mounted on said fork tower and facing forwardly; a pair of front wheels spaced apart and connected to said frame adjacent the front thereof to support the front of said frame; yoke means pivotally connected to said frame adjacent the rear of said frame for at least 180° rotary movement of said yoke means about a vertical axis; rear wheel means pivotally carried by said yoke means for pivotal movement of said rear wheel means about a substantially horizontal first axis, said wheel means including an axle oriented along a substantially horizontal second axis located at right angles to said first axis, and a rear wheel mounted on said axle and substantially centered transversely under said frame, thereby permitting side to side tilting of said rear wheel relative to first axis; vertical drive shaft means extending vertically downwardly through said yoke means and connected to said axle for driving said axle, said drive shaft means including a universal joint connection therein and a telescopic section therein, to permit side to side tilting of said rear wheel; a motor mounted on said frame and coupled to said vertical drive shaft means for driving said rear wheel; and steering means connected to said frame for rotating said yoke means to steer said vehicle.

In another of its aspects, the invention provides a material handling vehicle having support and driving wheels, a first drive shaft, means connecting said first drive shaft to said wheels for driving said wheels, a motor, and clutch means coupled between said motor and said first drive shaft for enabling closely controlled slow speed creeping of said vehicle, said clutch means comprising: a second drive shaft connected to and driven by said motor, and mounted parallel to and spaced from said first drive shaft; a first split pulley mounted on said first drive shaft and a second split pulley mounted on said second drive shaft, each split pulley having a first pulley half fixed to its drive shaft and a second pulley half movable along its drive shaft; a belt extending between said pulleys; means biasing said second pulley half of said first pulley towards said first pulley half of said first pulley; means for moving said second pulley half of said second pulley along said second drive shaft to tension said belt and hence engage said clutch means when said second pulley half of said second pulley is moved towards said first pulley half of said second pulley, thus then to cause said belt to rotate to drive said wheels at a rate controlled by the speed of said motor and the spacing of said pulley halves.

In still another aspect, the invention provides a vehicle comprising: a pair of forks facing in a predetermined direction for supporting a pallet, a frame, a fork carriage, means mounting said fork carriage on said frame for movement back and forth in said direction between an extended outer position and a retracted inner position, means mounting said forks in said fork carriage and for raising and lowering said forks, stop means mounted on said frame in a position such that when said forks are in said extended position a pallet supported thereon is located outwardly of said stop means and such that said forks may be withdrawn inwardly of said stop means, gate means, and means for supporting said gate means outwardly of said stop means and extending across said forks, so that when said gate means is located between the contents of a pallet on said forks and said stop means and then said fork carriage is withdrawn inwardly, movement of said gate inwardly will be prevented by said stop means and said gate means will act to discharge the contents of said pallet onto the ground.

Further objects and advantages of the invention will appear from the following description, taken together with the accompanying drawings in which:

FIG. 26 is a side view similar to FIG. 25 but showing the pallet contents partly discharged;

FIG. 27 is a side view of a modified fork and gate construction according to the invention;

FIG. 28 is a front view of the fork and gate of FIG. 27;

FIG. 29 is a side view of a modified fork tine according to the invention;

FIG. 30 is a top view of the fork tine of FIG. 29;

FIG. 31 is a partly perspective view showing an indicator for showing the position of the rear wheels of the forklift vehicle;

FIG. 33 is a side view showing a cam of FIG. 32.

Figure 1:
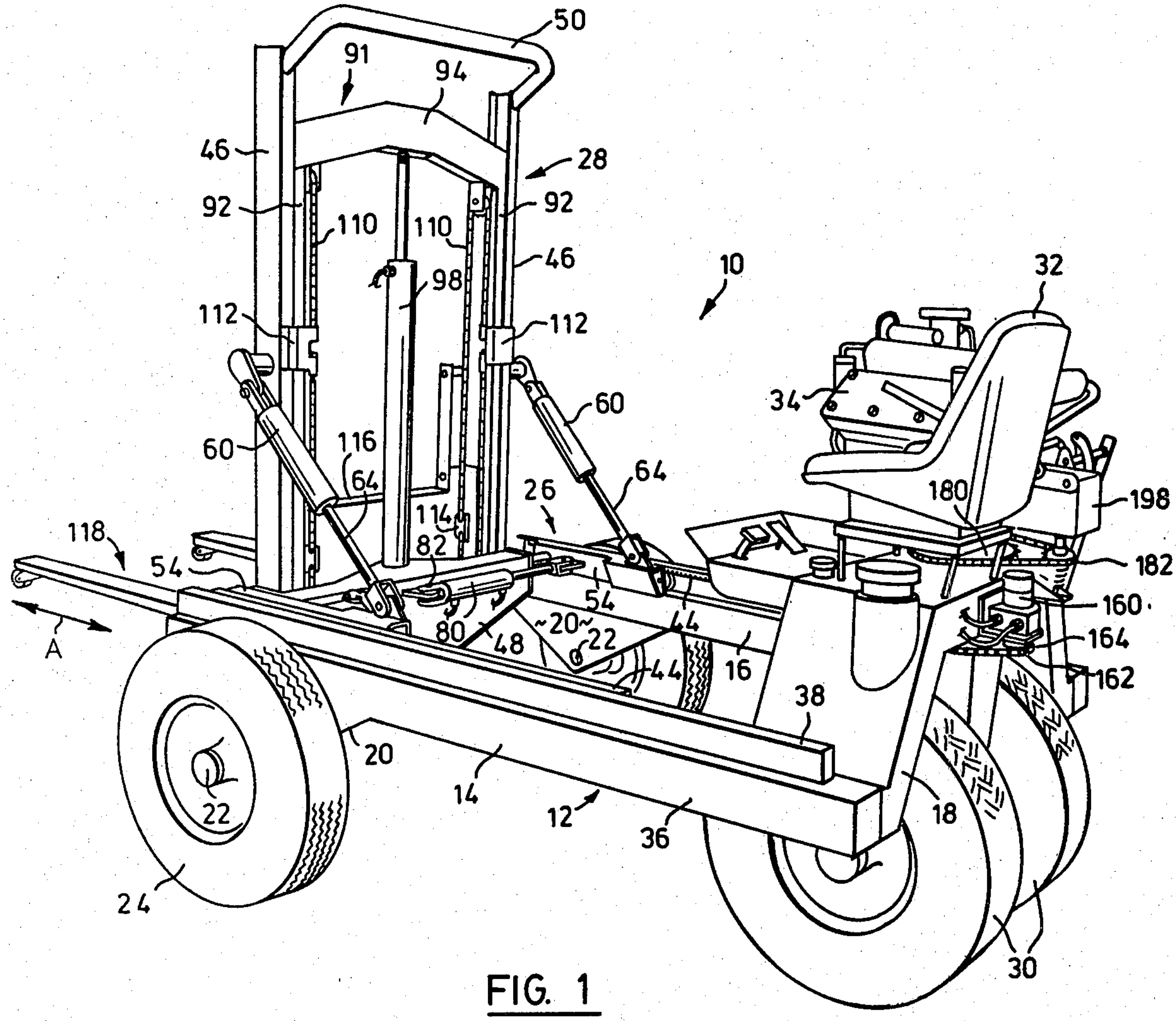
FIG. 1 is a perspective view of a forklift vehicle according to the invention.

Reference is first made to FIG. 1, which shows a preferred form of forklift vehicle 10 according to the invention. The forklift vehicle 10 has a frame 12 formed by a pair of elongated, parallel, laterally spaced, longitudinal frame members 14, 16 and a transverse rear frame member 18 which connects the rear ends of the frame members 14, 16. Each frame member 14, 16 has near its front an integral, triangular, downwardly extending plate 20. Axles 22 of front wheels 24 are mounted on and project outwardly from the bottoms of plates 20. Since the front wheels 24 are located on the outside of the frame members 14, 16, this leaves the space between the frame members 14, 16 clear for a fork carriage 26 and fork tower 28. The front wheels 24 are of substantial diameter, to facilitate travel over rough terrain along a forward and rearward path of travel indicated by arrow A, which is parallel with the frame members 14, 16.

The rear of the vehicle 10 is supported by a pair of rear wheels 30 which are centered under the rear transverse frame member 18. The rear wheels 30 also serve to drive and steer the vehicle. The operator controls the vehicle from a seat 32 located to one side of the rear wheels 30, and a gasoline or diesel motor 34 is located over the rear frame member 18 beside the driver's seat, where it will counterbalance the weight of the operator.

Figure 3:
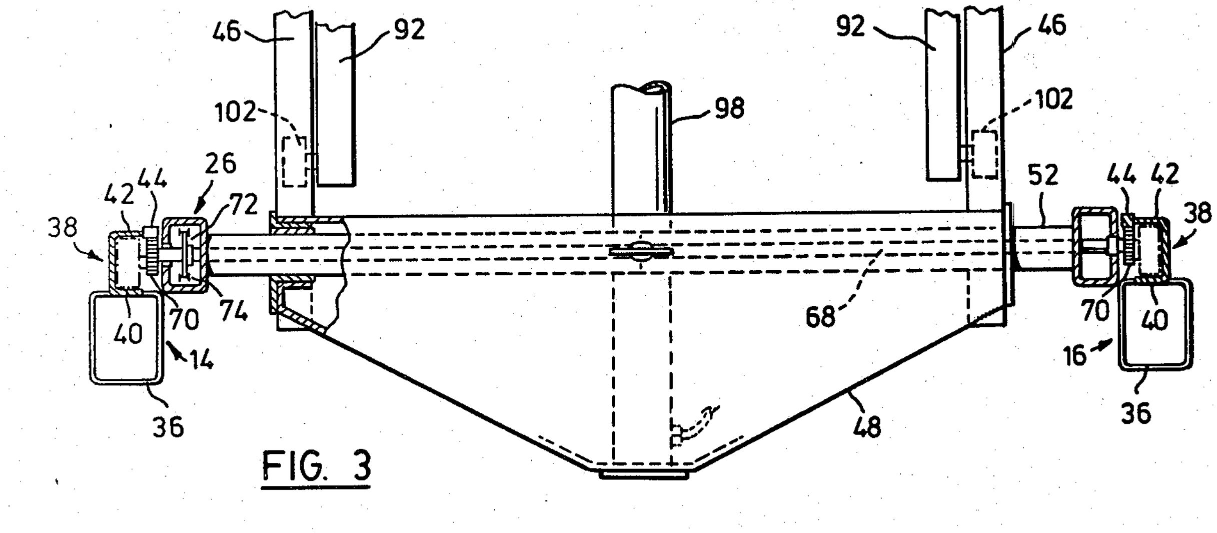
FIG. 3 is a sectional view taken along lines 3—3 of FIG. 2.
Figure 2:
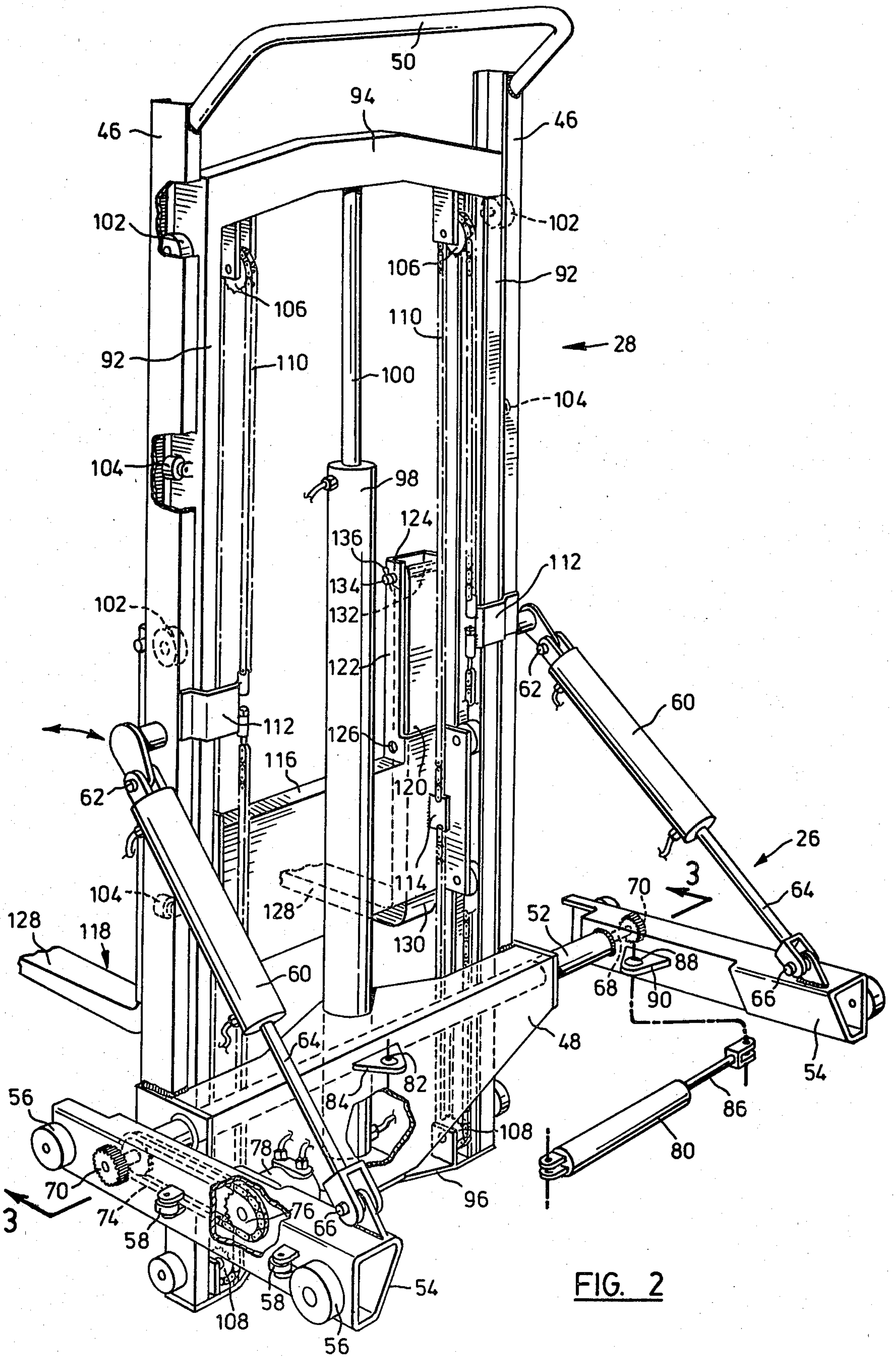
FIG. 2 is a perspective view, partly exploded, showing the fork carriage, tower, mast and forks of the FIG. 1 forklift vehicle.

The entire fork carriage 26 is movable frontwardly and rearwardly along the frame members 14, 16, and reference is next made to FIGS. 2 and 3 which together with FIG. 1 show the fork carriage 26 and the frame members 14, 16 in more detail.

As best shown in FIG. 3, each frame member 14, 16 includes a box-shaped channel 36 having a U-shaped channel 38 located thereabove. The U-shaped channels 38 are oriented on their sides and face inwardly towards each other. The lower leg 40 of each U-shaped channel 38 forms an integral portion of the box-shaped channel 36, being welded to fill the gap which would otherwise be present in the box-shaped channel 38. This avoids overlap of material and helps to lighten the forklift vehicle to reduce the load which must be transported when the forklift vehicle is being carried from one site to another. The upper leg 42 of the U-shaped channel 38 carries at its tip a longitudinally extending rack 44.

The fork tower 28 includes (FIG. 2) a pair of vertically oriented, laterally spaced channels 46 which face inwardly towards each other and which are welded to a base 48. The tops of the channels 46 are connected by a U-shaped tube 50 which holds them in proper spaced relation.

The base 48 of the fork tower 28 is pivotally and slidably mounted on a transverse tube 52, by rollers (not shown). Each end of the tube 52 is welded to a longitudinally extending hollow carriage side member 54. The outer side surfaces of the side members 54 carry wheels 56 which fit snugly within and roll within the U-shaped channels 38 (FIG. 3) and to carry the weight of the fork carriage. Side thrust rollers 58 (FIG. 2) are also carried by the carriage side members 54, to act as side thrust bearings.

Since the fork tower base 48 is pivotally mounted on tube 52, the fork tower 28 can tilt in an arc extending forwardly and rearwardly. The forward and rearward tilting is controlled by a pair of cylinders 60. The butt end of each cylinder 60 is pivotally connected by a ball joint 62 to its associated upright channel 46 of the fork tower, and the rod 64 of the piston in each cylinder is pivotally connected by another ball joint 66 to its associated carriage side member 54. Extension and retraction of the piston rods 64 will tilt the tower 28 forwardly and rearwardly.

The fork carriage 26 is propelled forwardly and rearwardly along the frame members 14, 16 as follows. A transverse shaft 68 (FIGS. 2, 3) extends through the tube 52 and carries a drive gear 70 at each end thereof. The drive gears 70 (FIG. 3) engage the teeth of the rack 44 on each frame member. Inside one of the hollow carriage side members 54, the shaft 68 carries a sprocket 72 which is connected by a drive chain 74 to a second sprocket 76. The sprocket 76 is mounted on the shaft of a hydraulic motor 78 secured to the carriage side member 54. When the hydraulic motor 78 is operated, its sprocket 76 drives the gears 70 through the chain 76 and sprockets 72, 76, thus moving the fork carriage forwardly or rearwardly as desired. Since the sprockets 72, 76 and the chain 74 are located entirely within the enclosure of the carriage side member 54, they are relatively well protected from the dirt, mud and stones which inevitably are present at construction sites. In addition, since the teeth of the racks 44 face downwardly, dirt and stones are unlikely to become wedged therein to interfere with the movement of the fork carriage 26.

To permit sideways adjustment of the fork tower 28 without sideways movement of the vehicle, a sideways movement cylinder 80 is pivotally connected at 82 to a mount 84 on the fork tower base 48. The rod 86 of the piston in cylinder 80 is pivotally connected at 88 to a mount 90 on the fork carriage side frame member 54.

The mast 91 of the fork tower 26 is conventional and includes a pair of side channels 92 connected together by top and bottom cross members 94, 96 respectively. The mast 91 is raised and lowered by a conventional vertically oriented cylinder 98 secured to the base 48 and having a piston rod 100 extending upwardly and secured to the top cross member 94. The outwardly opposed surfaces of channels 92 of the mast carry sets of rollers 102, 104 to guide the mast in the tower channels 46 as the mast moves up and down.

At each side thereof the mast 91 carries upper sprockets 106 and lower sprockets 108. Chains 110 extend around these sprockets and are secured to brackets 112 welded to the outer tower frame channels 46. At their front runs the chains 110 are secured to blocks 114 which in turn are connected to the rear of a fork holder 116. Two forwardly facing forks generally indicated at 118 are connected to the fork holder 116 in a manner to be described.

It will be seen that as the piston rod 100 of the tower cylinder 98 is extended, the forks 118 will rise in conventional manner at twice the rate of such extension. Similarly as the piston rod 100 is retracted, the forks 118 will be lowered at twice the rate of the retraction.

As best shown in FIG. 2, the fork holder 116 includes a pair of pockets 120, one at each side thereof (only one such pocket is visible in FIG. 2). Each pocket 120 is formed in part by an upward channel-shaped extension 122 from each side of the fork holder 116. Each upward extension 122 has upper and lower transverse holes 124, 126 extending therethrough.

The forks 118 are L-shaped, each having a forwardly extending tine 128 and an upwardly extending back piece 130. Each back piece 130 has a transverse hole 132 therethrough so that the fork may be hung from the fork holder 116 by pins 134 which extend through the holes 132 in the fork back piece and through holes 124 or 126 in the fork holders extensions. The pins 134 are held in place by hairpin retainers 136.

Figure 4:
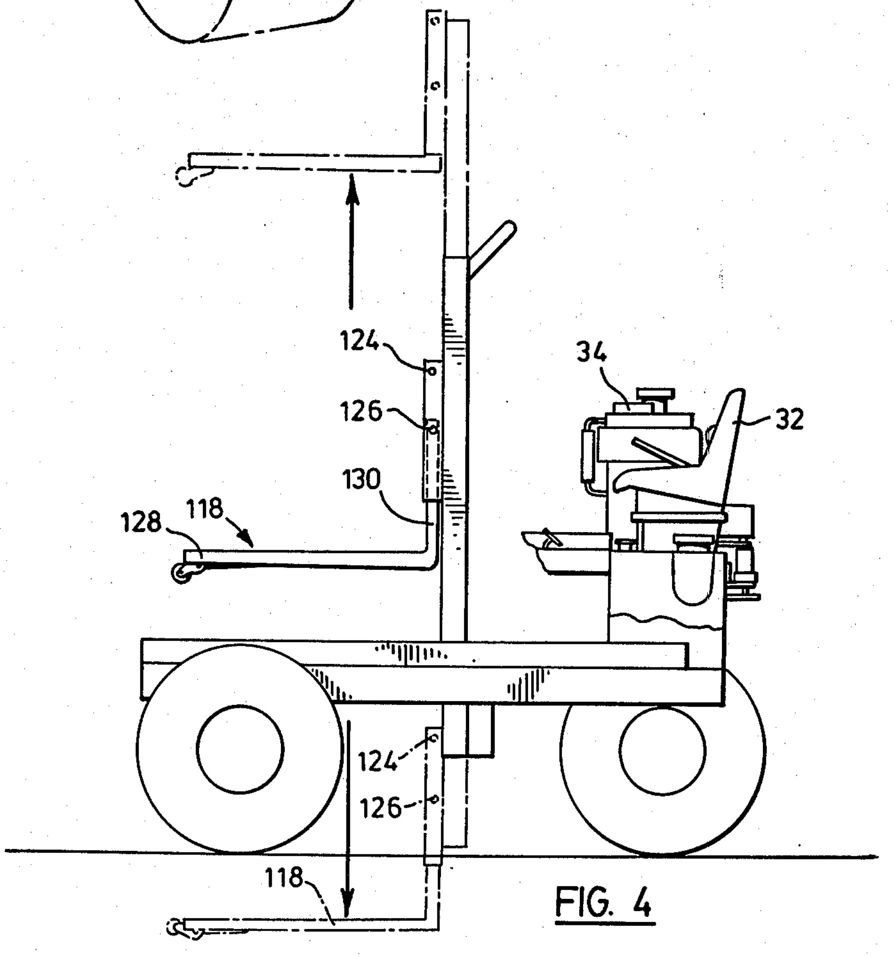
FIG. 4 is a side view showing various fork positions for the vehicle of FIG. 1.

The arrangement described for mounting the forks 118 permits two fork positions, namely an upper position shown in FIG. 2 in which the forks 118 can be raised to the maximum extent, and the lower position shown at the bottom of FIG. 4. To move the forks to the lower position the pins 134 are removed, each fork is moved to its lower position, and the pins 134 are then reinserted through holes 132, 126 to secure the forks in their lower position. When the forks 118 are in their lower position, retraction of the piston rod 100 of the fork tower will drive the forks to a position substantially below the bottom of the wheels of the vehicle, as shown in FIG. 4. This permits the vehicle to be raised so that it can be locked to the underside of a trailer, as will be explained.

Figure 5:
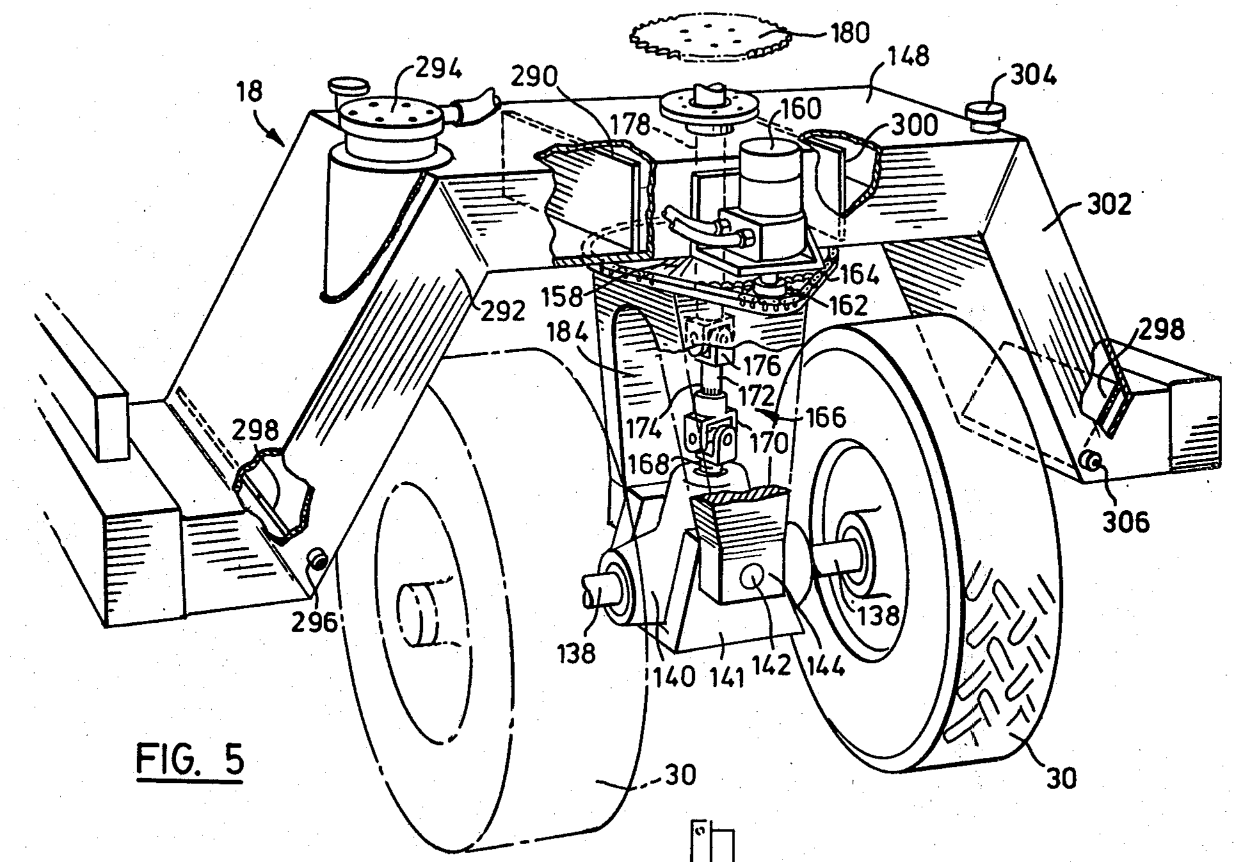
FIG. 5 is a perspective rear view, partly exploded, of the rear frame portion, rear wheels and rear drive arrangement of the FIG. 1 vehicle.
Figure 6:
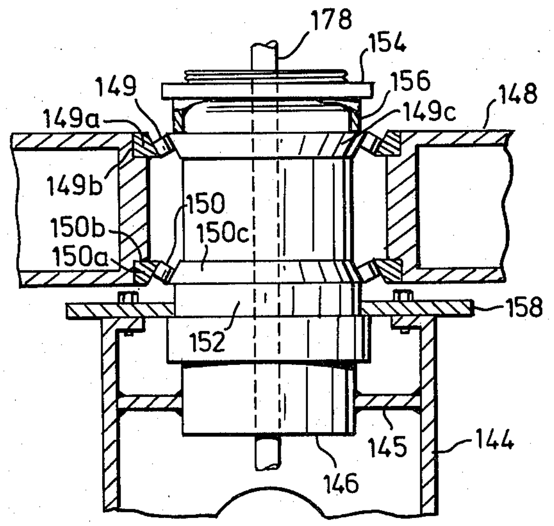
FIG. 6 is a partly sectional view showing the mounting of a yoke shown in FIG. 5.
Figure 6A:
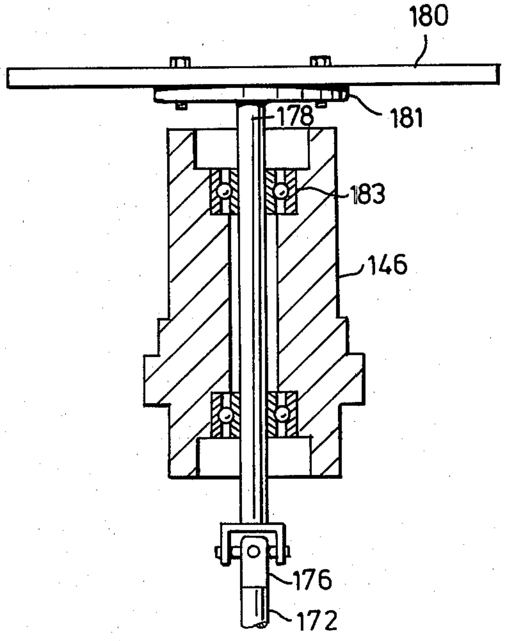
FIG. 6a is a sectional view of a metal tube shown in FIG. 6.

Reference is next made to FIGS. 5, 6 and 6A, which show the mounting for the rear wheels 30. As shown, the rear wheels 30 are relatively closely spaced, being mounted on short axles 138 which extend outwardly from opposite sides of a differential unit 140. The differential unit 140 is secured to a U-shaped holder 141 which is pivotally mounted, by pivot shaft 142, within a yoke 144. The axis of pivot shaft 142 is horizontal and oriented at right angles to that of axles 138, permitting side to side tilting of the rear wheels 30.

The yoke 144 has a cross plate 145 (FIG. 6) welded across its upper portion. A large diameter metal tube 146 is welded to cross plate 145 and from the center of cross plate 145, and then extends upwardly through the center horizontal raised portion 148 of transverse frame member 18. The tube 146 is secured to the transverse frame member center portion 148 by upper and lower tapered roller bearings 149, 150. The upper bearing 149 has a cup **149*a* set in an upper recess 149*b* in the transverse frame member portion 148 and a race 149*c* pressed onto the tube 146. The lower bearing 150 has a cup 150*a* set in a lower recess 150*b* in the portion 148 and a race 150*c* supported on a collar 152 formed on tube 146 by machining. This arrangement supports the weight of the rear of the vehicle on the tube 146, and hence on the rear wheels 30. The top of the tube 146 is threaded and a ring nut 154 is mounted thereon with a collar 156 extending between ring nut 151 and race 149C. Thus when the vehicle is raised, the weight of the yoke 144** and its associated mechanism will be supported from the ring nut.

Steering is achieved by a large sprocket 158 bolted to the top of the yoke 144 beneath the transverse frame member center portion 148. A hydraulic steering motor 160 is provided having a sprocket 162 connected by a chain 164 to the large sprocket 160. Operation of the hydraulic motor 160 will rotate the sprockets 162, 158 to rotate the yoke 144 through 360° in a horizontal plane, to allow steering of the vehicle in any direction.

Figure 7:
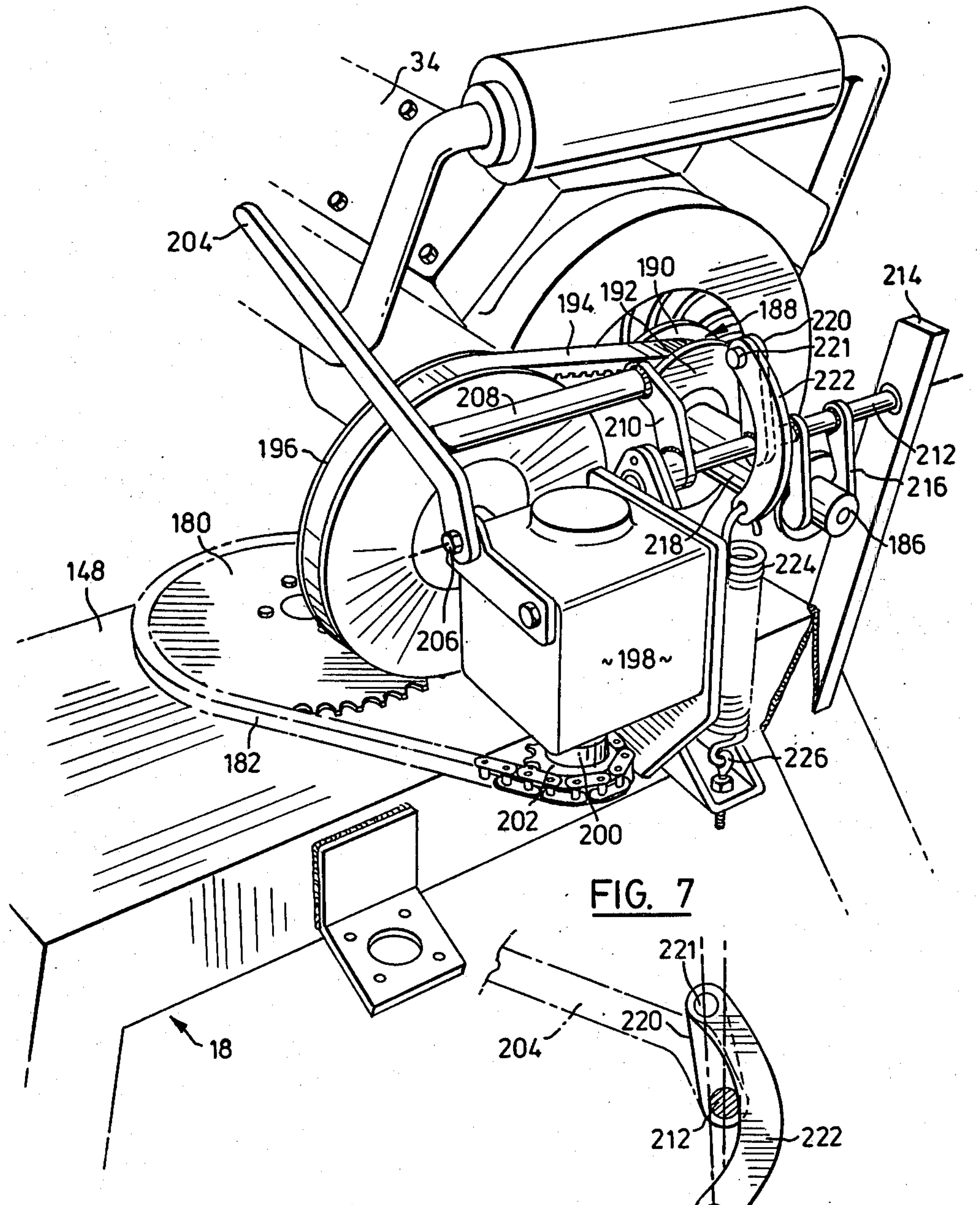
FIG. 7 is a rear perspective view showing the clutch and gear box arrangement for driving the rear wheels of the forklift vehicle.

Drive to the rear wheels 30 is provided via drive shaft means generally indicated at 166 (FIG. 5). The drive shaft means 166 includes a lower drive shaft 168, a lower universal joint 170, an intermediate drive shaft 172 telescopically fitted into the lower universal joint 170 by splines 174, an upper universal joint 176, and an upper drive shaft 178. A sprocket 180 is secured to a plate 181 (FIG. 6A) at the top of the upper drive shaft 178 to receive drive from a drive chain 182 (FIG. 7). The upper portion of the upper drive shaft 178 is supported within the tube 146 by bearings 183 (FIG. 6A) located within the tube 146.

The drive shaft arrangement shown, with the universal joints 170, 176 and telescopic center portion, allows substantial tilting of the rear wheels from side to side without affecting the stability or equilibrium of the vehicle. For example, one rear wheel may be located on a substantial bump while the other rear wheel may be located in a dip, but if the front wheels are level, the vehicle itself will remain level. The large opening 184 in the yoke 144 permits the universal joint 170 to move sideways are required when the wheels tilt and when the drive shaft assumes a bent configuration, and also provides space for the differential unit 140 and to holder 141 to tilt. The upper universal joint 176 reduces the sideways movement of the bottom of the upper drive shaft 178 and therefore allows use of a smaller diameter yoke support tube 146.

The manner in which the speed of the vehicle is controlled will next be described. As shown in FIG. 7, the motor 34 has a drive shaft 186 extending therefrom. A split pulley 188 has one half 190 fixedly mounted on the drive shaft 186 by splines and a conventional set screw (not shown). The other half 192 of the split pulley 188 is splined onto the shaft 186 but is free to move along the shaft in the direction of the axis of shaft 186. A belt 194 extends around split pulley 188 and around a larger pulley 196 which in turn is connected to a right angle gear box 198. A drive shaft 200 extends from the bottom of gear box 198 and carries a small sprocket 202 which is connected by the chain 182 to the sprocket 180 at the top of the upper drive shaft 178. Thus, when the movable half 192 of split pulley 188 is pushed inwardly towards the fixed half 190 to raise the belt 194 on the pulley sufficiently to tension the belt, power is transmitted from the motor to the rear wheels 30.

Movement of the split pulley half 192 is controlled by a clutch lever 204. The lever 204 is pivotally mounted at 206 on the gear box 198 and carries, spaced above pivot point 206, a rod 208 which projects laterally from lever 204. The rod 208 is welded to a lever arm 210 which is in turn welded to a clutch rod 212. The clutch rod 212 is pivotally mounted between the gear box 198 and a support strut 214. A pair of fingers 216 are welded to the clutch rod 212 and extend downwardly to contact the outer face of a bushing 218 which is rotatably mounted on drive shaft 186. The inner end of bushing 218 contains a ball bearing race (not shown) which presses against the outer surface of the split pulley half 192.

The clutch lever 204 is normally biased so that the clutch is disengaged. Bias is provided by a lever arm 220 having its inner end welded to clutch rod 212 and its outer end pivotally connected at 221 to a curved arm 222. The bottom of the curved arm 222 is biased downwardly by a heavy coil spring 224. The bottom of the coil spring 224 is connected to an eye bolt 226 connected to the upper transverse frame portion 148. The vertical position of eye bolt 226 is adjustable to control the tension of spring 224 and hence the clutch bias force.

In operation of the clutch mechanism, when the clutch lever 204 is moved clockwise as drawn in FIG. 7, the fingers 216 are also rotated clockwise to push the bushing 218 inwardly on the shaft 186. This tensions the belt 194 and produces drive to the rear wheels 30. The speed of the motor can be left constant at this time, and a very low speed creeping drive can be achieved, the rate of which is closely controllable by movement of the clutch lever 204. Such very low speed closely controllable creeping drive is extremely advantageous when loading and unloading on rough terrain when very small movements are required to adjust the position of the forklift vehicle.

Figure 8:
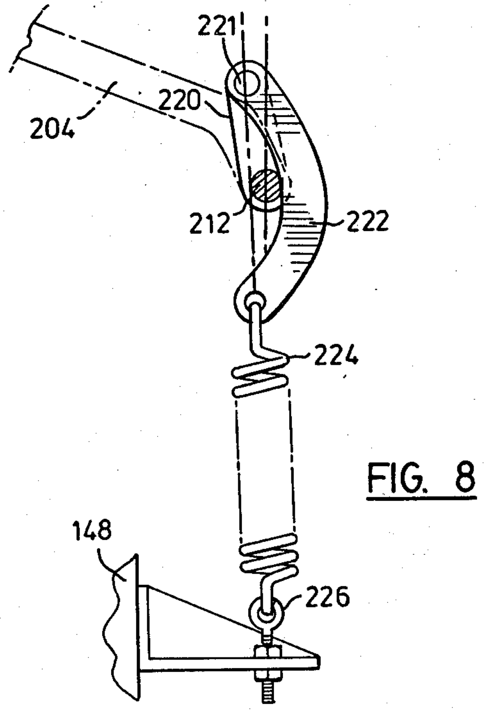
FIG. 8 is a side view of the clutch bias linkage of FIG. 7.

As described and as will be apparent from FIG. 8, the clutch lever 204 is normally biased counterclockwise to a disengaged position by spring 224. However, when the clutch lever 204 is rotated clockwise sufficiently to carry the pivotal connection 221 of arms 220, 222 to the right past the axis of the clutch rod 212, then the spring 224 biases the clutch into engaged condition, thus assisting the operator in controlling the low speed creeping of the vehicle. The bias linkage described thus is an over-the-center linkage.

Figure 8A:
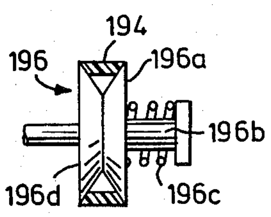
FIG. 8a is a side view of a split pulley of FIG. 7.

Pulley 196A is also a split pulley, as shown in FIG. 8A, where pulley half 196 is shown as being splined on and biased along shaft 196B by spring 196C toward pulley half 196D. Thus, as the effective diameter of pulley 188 increases, that of pulley 196 decreases (since the pressure of the belt forces pulley halves 196A, 196D apart), thus changing the drive ratio and increasing the speed of travel of the machine as the clutch is further engaged.

Figure 9:
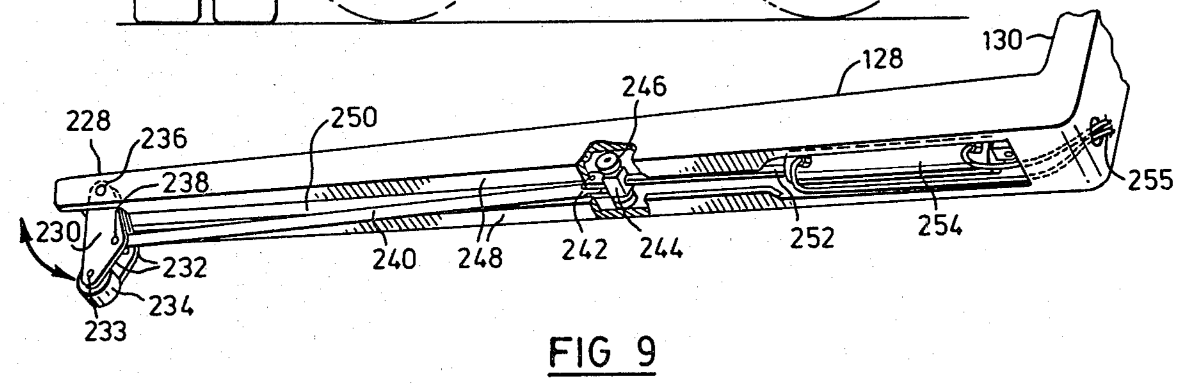
FIG. 9 is a perspective bottom view of a fork of the forklift vehicle.

Reference is next made to FIG. 9, which shows in more detail the construction of a fork tine 128. As shown, each tine 128 is hollow and has at its tip 228 a roller mount 230. Each roller mount 230 consists of a pair of triangular plates 232 spaced apart at their bottom by a shaft 233 bearing a roller 234 and held at their tops by a pin 238 pivotally connected to the sides of the tine 128. The rear centers of the plates 232 are connected together by a pin 238 on which one end of a rod 240 is pivotally mounted. The other end of rod 240 is pivotally connected at 242 to a slider 244 having a pair of rollers 246. The rollers 246 roll on the inside bottom spaced flanges 248 of the tine 128 and the rod 240 extends through the slot 250 between the flanges 248. Connected to the slider 244 is a piston rod 252 of a hydraulic cylinder 254. The hoses 255 from cylinder 254 extend through the back piece 130 of the fork and then are fed with appropriate slack to the controls and pump (not shown) of the vehicle.

Figure 10:
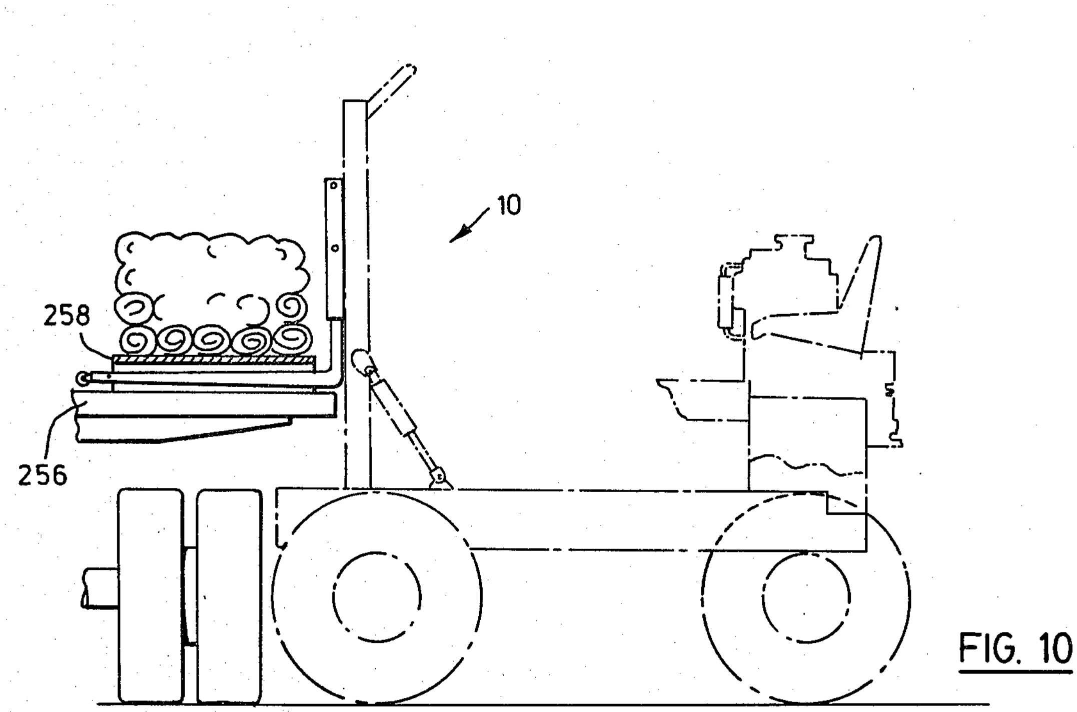
FIG. 10 is a side view of the forklift vehicle of FIG. 1 showing the vehicle about to pick up a pallet of sod from a trailer.
Figure 11:
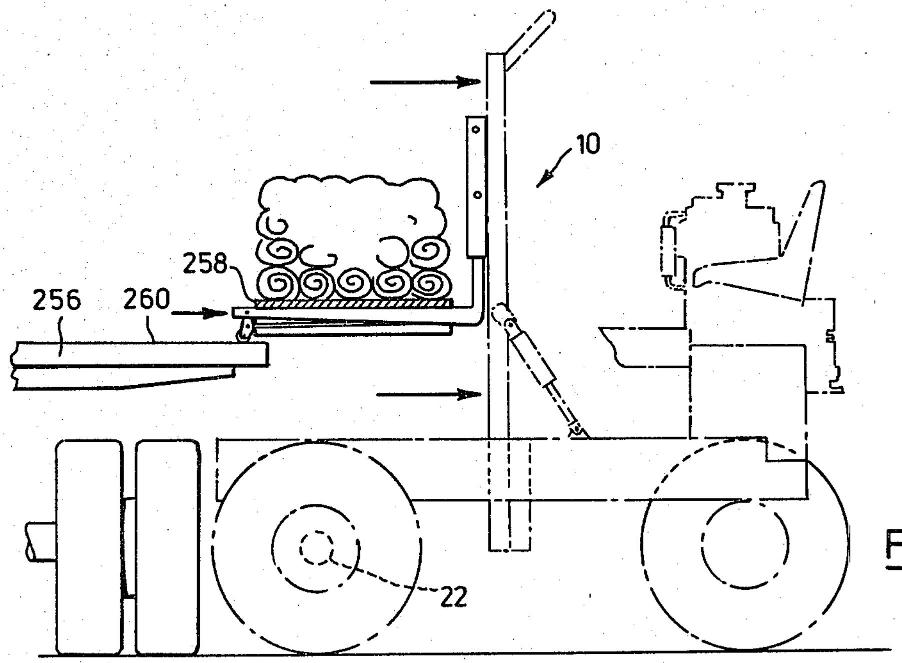
FIG. 11 is a view similar to that of FIG. 10 but showing the pallet of sod being retracted by the fork carriage of the forklift vehicle.

As the tine piston rod 252 is extended and retracted, the roller mount 230 is moved from the erected position shown in FIGS. 9 and 11 to the retracted position shown in FIG. 10, in which the roller 234 and its mount 230 are nearly flush with the bottom of the tine 128.

In operation, the forklift vehicle with its fork carriage 26 moved to its rearmost position is typically moved to a side of a trailer 256 (FIGS. 10, 11) containing a pallet 258 of material such as sod to be unloaded. The forks 118 are then raised to the desired position and the fork carriage 26 is next moved forwardly with the vehicle stationary so that the tines 128 penetrate through the boards of the pallet 258, as shown in FIG. 10. The tine rollers 234 are retracted at this time so that they will not interfere with the movement of the tines through the pallet 258.

When the tines 128 have penetrated through the pallet, the cylinders 254 in the tines are activated to erect the roylers 234 so that the weight of the tips of the forks will be supported on the upper surface 260 of the trailer 256. The forks may be raised slightly at this time to assist in the erection of the rollers 234. While the forklift vehicle 10 remains stationary, the fork carriage 26 is then retracted rearwardly by means of the hydraulic motor 78, and as shown in FIG. 11. As indicated, tipping of the forklift vehicle is prevented since the weight of the pallet 258 is partially supported by the upper surface of the trailer.

When the fork carriage 26 has moved rearwardly sufficiently so that the rollers 234 are clear of the trailer upper surface 260, the fork carriage 26 will have moved rearwardly sufficiently so that the load of the pallet 258 is above or slightly rearwardly of the axles 22 of the front wheels 24 of the forklift vehicle. In this position the forklift vehicle is stable and no frontwards tipping of the vehicle can occur. The forklift vehicle can then transport the load to the desired location and unload it.

To load a pallet 258 on a trailer 256, the procedure is the reverse of that described. Specifically, the forklift vehicle is driven up to the trailer with the fork carriage 26 in its rearmost position and with the forks 118 at the level desired for travel. The forks 118 are then raised to or above the desired level for loading (normally just before the trailer is reached); then the pallet rollers are erected; the load is moved slightly forwardly (by moving carriage 26 forwardly) and then lowered until the pallet rollers 234 engage the outer edge of the upper surface 260 of the trailer. The fork carriage 26 is then moved forwardly to load the pallet 258 on the vehicle.

Instead of rollers 234, shoes which spread the weight of the load on the forks over a larger area may be used.

Figure 13A:
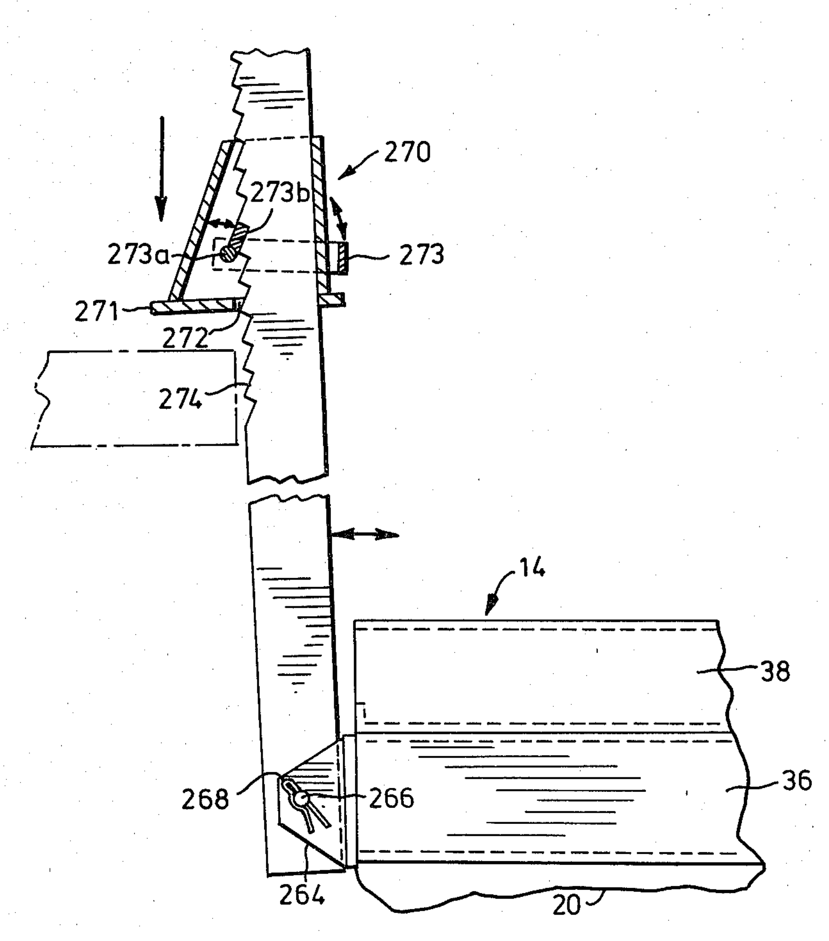
FIG. 13A is a side view showing detail of the ratchet bars of FIG. 12.
Figure 12:
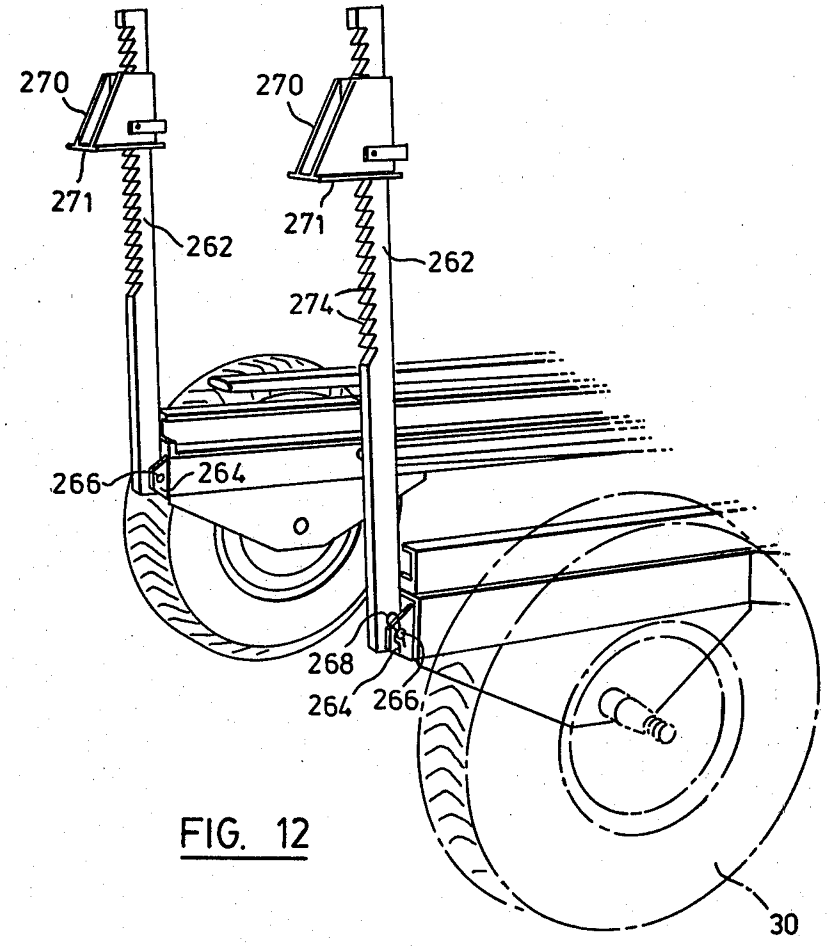
FIG. 12 is a perspective view of the front portion of the forklift vehicle of FIG. 1, showing ratchet bars mounted therein.
Figure 13:
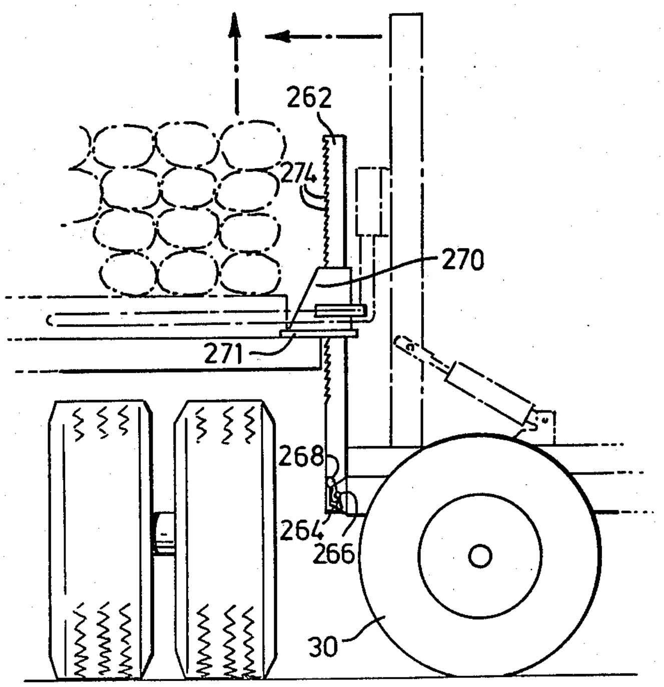
FIG. 13 is a side view of the vehicle of FIG. 1 with the bars of FIG. 12 in place and with the vehicle positioned to unload a trailer.

In some cases it may be desired to load or stack pallets 258 one above the other, and if the upper surface of the material on the pallet is uneven, or unable to bear a concentrated load, then the tine rollers 234 of FIG. 9 cannot be used. In that case, and as shown in FIGS. 12, 13 and 13A, upright ratchet bars 262 may be mounted at the fronts of the longitudinal frame members 14, 16. The ratchet bars 262 are removably mounted on U-shaped forwardly facing channel sections 264 secured to the front of the frame members 14, 16 and are held in position by pins 266 extending through holes (not shown) in the channel sections 264 and bars 262. Hairpin retainers 268 hold the pins 266 in position. Support sliders 270 are provided, movable vertically on the ratchet bars and having base plates 271. The base plates 271 contain conventional apertures to permit bars 262 to pass therethrough and retainers 273 hinged at 273*a* to the sliders 270. When the retainers 273 are pivotted clockwise as drawn, then internal bars 273*b* engage the downwardly facing teeth 274 of the ratchet bars 262 and prevent upward movement of the sliders. Conventional further retaining means, not shown, may be provided to prevent forward or downward movement of sliders 270 on bars 262 except when desired.

In operation, and as shown in FIG. 13, the forklift vehicle 10 is moved forwardly to the trailer 256 and the support sliders 270 are moved downwardly until they engage the upper surface of the trailer. The retainers 273 then engage the teeth 274 on the ratchet bars 262 to prevent the sliders from moving upwardly. The sliders 270 resting on the upper surface of the trailer 256 will prevent the forklift vehicle from tipping as pallets are loaded and unloaded with the weight of the pallets located forwardly of the front wheels 24 of the vehicle.

Figure 14:
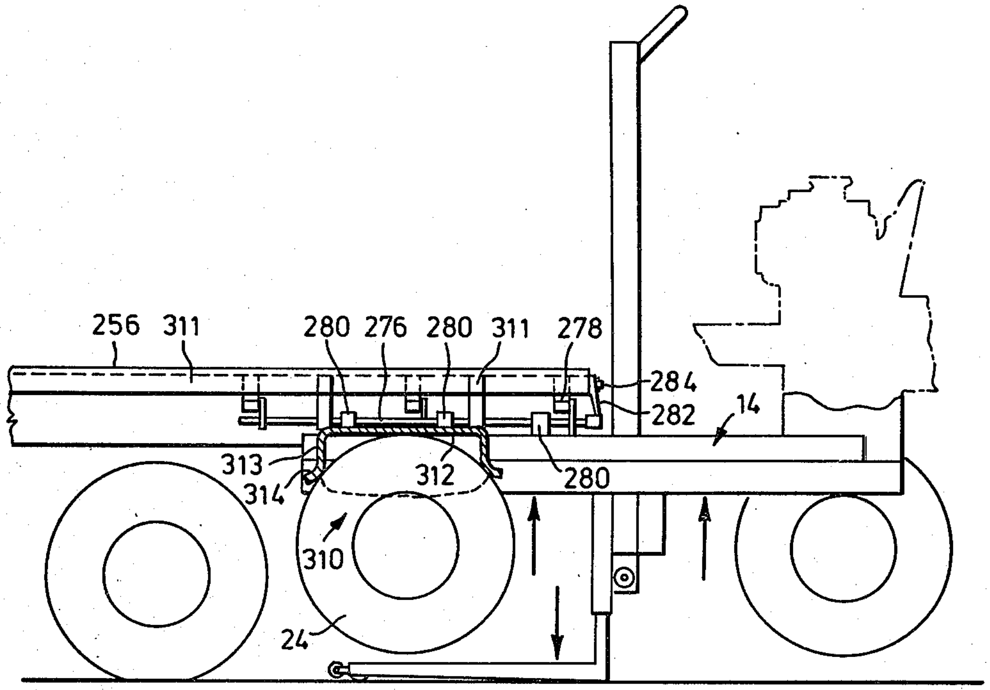
FIG. 14 is a side view of the forklift vehicle of FIG. 1, showing it raised by its forks to the underside of a trailer.

Reference is next made to FIG. 14 through 18, which illustrate how the forklift vehicle may be loaded onto a trailer 256 for transport. When the forklift vehicle 10 is to be so loaded, it is driven up to the rear of the trailer and its fork carriage 26 is moved to its most rearward position. The forks 118 are then lowered so that they almost touch the ground. The forklift vehicle is then driven forwardly so that the forks 118 move beneath the back of the trailer 256, as shown in FIG. 14, with the fork tower 28 almost touching the rear of the trailer. The forks 118 at this time will be in their lower position, with the fork pins 134 extending through the lower holes 126 (FIGS. 2, 4) in the fork holder extensions 122. The mast piston rod 100 is then retracted, forcing the forks 118 downwardly and raising the forklift vehicle off the ground. The rear of the forklift vehicle may tend to tilt rearwardly at this time, but as soon as the forward ends of the frame members 14, 16 engage the underside of the trailer, the forklift vehicle will pivot to a horizontal position and will be raised until the frame members 14, 16 are fully pressed against a pair of longitudinally oriented locating beams 276 mounted on the underside of the trailer 256.

Figure 15:
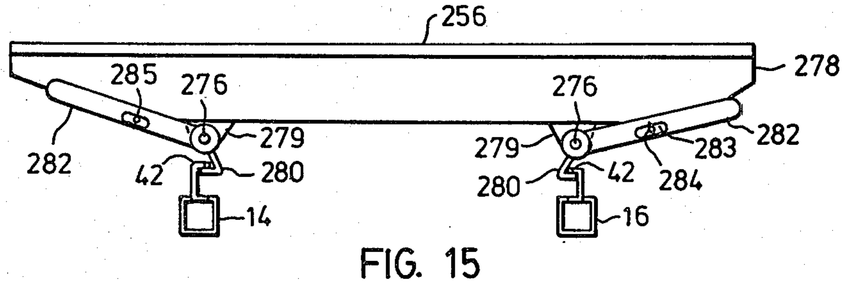
FIG. 15 is a rear view showing clamping mechanism fitted to the underside of a trailer to secure the forklift vehicle to the trailer.
Figure 16:
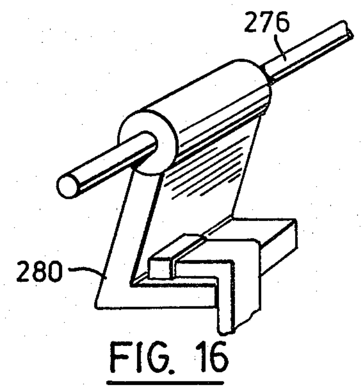
FIG. 16 is a perspective view of a portion of the clamping mechanism of FIG. 15.
Figure 17:
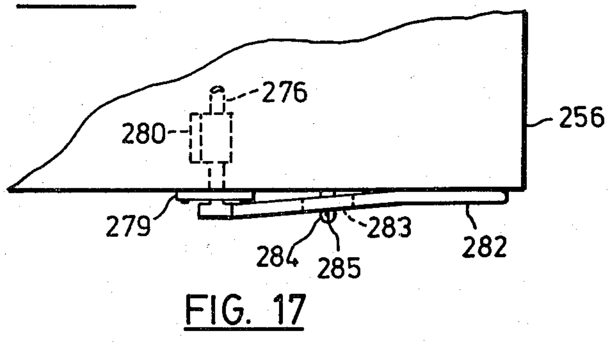
FIG. 17 is a top view showing the clamping mechanism of FIG. 15.

Locking means shown in FIGS. 15 to 17 are provided to lock the vehicle to the trailer. The locking means includes a pair of longitudinally extending spaced shafts 276 pivotally suspended from the cross beams 278 of the trailer by mounting plates 279. Each shaft 278 carries a pair of L-shaped clamps 280 welded thereto. The shafts 276 are rotated by lever arms 282 secured to the ends of the shaft. As shown in FIGS. 15 and 16, when the forklift vehicle frame members 14, 16 are in position beneath the trailer, and pressed up against bumpers not shown, then lever arms 282 are moved upwardly to press clamps 280 against the inside surfaces of upper legs 42 of the frame members 14, 16. The lever arms 282 are made of springy steel and have slots 283 therein, so that lever arms 282 may be forced rearwardly and then allowed to spring forwardly against the rear of the trailer so that studs 284, which are fixed to the rear of the trailer, extend through slots 283. Pins 285 are then inserted through holes in the studs 284 to lock the lever arms 282 and hence the clamps 280 in position. The forklift vehicle 10 may then also be chained to the rear of the trailer to prevent it from sliding rearwardly and for added security. With this arrangement, the lever arms 282 are unlikely to become unlocked, and even should this occur, the weight on the legs of the L-shaped clamps 280 is located directly below pivot shafts 276, reducing the likelihood of accidental detachment of the vehicle.

The weight of the forklift vehicle may be kept to a minimum by using the rear transverse frame member 18 to hold fuel and hydraulic fluid. As shown in FIG. 5, baffles 288, 290 are welded inside the transverse frame member 18 at one side thereof to create an internal tank 292 which holds hydraulic fluid. The fluid may be inserted through a filler cap 294 and withdrawn through duct 296. Similar baffles 298, 300 are welded within the other side of the frame member 18 to create a tank 302 for fuel which may be added through filler cap 304 and withdrawn through duct 306 for use as required by the motor. It will be seen that the baffles 288, 298 are welded just upwardly of the bends in the transverse frame member 18, to ensure that no leakage will occur should unusual stress cause the transverse frame member 18 to crack at its bends. Of course separate tanks made for example from glass fibre material may be used, located within or supported by the frame member 18.

Figure 18:
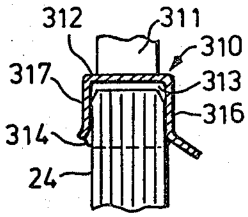
FIG. 18 is an end view, partly in section, showing a wheelholder for use in clamping the forklift vehicle to a carrier vehicle.

If desired, and as shown in FIGS. 14 and 18, wheelholders 310 may be mounted on the trailer or other vehicle which is to carry the forklift, by supports 311. Each wheelholder 310 is generally box-shaped, having a flattened upper plate 312 and two downwardly extending end plates 313 with outwardly flared ends 314. The flared ends 314 press into and deform the forklift vehicle wheels 24 (which are normally rubber tires) when the forklift vehicle is raised up against the underside of the trailer or other carrier vehicle. This assists in positioning and securing the forklift vehicle to the underside of its carrier vehicle.

From the end, the wheelholders 310 have the configuration shown in FIG. 18, i.e. they have a downwardly and inwardly sloping inner side plate 316 and a shorter outer side plate 317. The plates 316 help to align the forklift vehicle in the sideways direction as it is raised on its forks toward the underside of the carrier vehicle.

Figure 19:
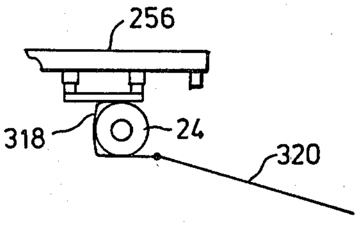
FIG. 19 is a diagrammatic side view showing another form of wheelholder for use in securing the forklift vehicle to a carrier vehicle.

If desired, and as shown diagrammatically in FIG. 19, U-shaped wheelholders 318 facing rearwardly can be mounted on the carrier vehicle and a ramp 320 can be used to support the forklift vehicle so that it may be driven upwardly along the ramp until its front wheels enter wheelholders 318. The forks can then be used to raise the rear of the forklift vehicle so that it can be chained to its carrier vehicle. The wheelholders 318 can also be used without the ramps, particularly with the fork extenders next to be described, since the forklift vehicle can be raised on its forks, then the fork carriage can be operated to move the frame of the forklift vehicle forwardly until the front wheels 24 enter the wheelholders 318.

Figure 20:
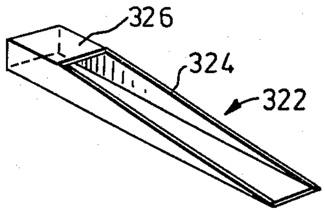
FIG. 20 is a perspective view of a fork extender according to the invention.
Figure 21:
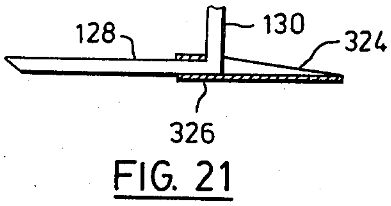
FIG. 21 is a side view showing the fork extender of FIG. 20 in position on a fork tine.

Reference is next made to FIGS. 20 and 21, which show a fork extender 322 which may be inserted onto each fork tine 128 to extend the tines rearwardly. Each fork extender 322 comprises an upwardly facing elongated U-shaped channel 324 having a closed box-shaped rear portion 326. The closed rear portion 326 may simply be slid rearwardly over each tine, up to the back piece 130, with the channel 324 extending rearwardly beyond the forks. Since the forklift vehicle is typically nearly balanced above the forks when the fork carriage is in its rearmost position, the fork extenders 322 ensure that when the forks are driven below the ground, the vehicle will sit upright on its forks without tilting rearwardly. This is useful in some circumstances, for example when the vehicle is to be stored for a long period of time. The feature is also useful when the vehicle is mired in mud or rough ground and cannot be driven by its wheels, in which case the vehicle can be raised above the ground by its forks, moved forwardly by operation of the fork carriage, and then set down. The vehicle can thus move forwardly or rearwardly in a succession of steps, by using its forks. This movement can also be accomplished without the fork extenders 322 since such self rescue operation can be carried out with the vehicle tipped rearwardly and with a small proportion of its weight on the rear wheels.

Figure 22:
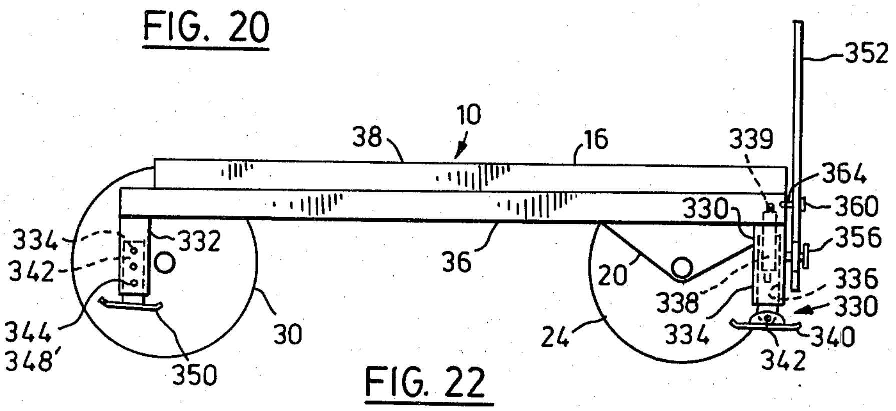
FIG. 22 is a side view of a portion of the forklift vehicle previously shown, and showing front and rear legs thereon, and also showing an optional gate structure.

In some operating conditions, it may be advantageous to fit the forklift vehicle 10 with front and rear legs 330, 332, as shown in FIG. 22. There are two front legs 330, one extending downwardly from the front of each frame member 14, 16. Each front leg 330 includes an upper leg portion 334 welded to its channel 36 and a jack leg 336 telescopically fitted in the upper leg portion 334 and movable upwardly and downwardly therein. The jack leg 336 is powered by a piston and cylinder 338 secured to the jack leg and to a fitting 339 welded to the interior of the channel 36. A bottom support plate 340 is pivotally secured at 342 to the bottom of the jack leg 336.

In a machine having the proportions shown in the drawings, and weighing about 2,300 pounds, it has been found that with the front legs 330 extended downwardly to support the front of the vehicle, and with the fork carriage 26 at its forward most position, a load of at least 4,500 pounds can be placed on the forks without tipping the machine forwardly. Since this exceeds most loads which the forklift will usually be required to handle, the forklift vehicle in use can be moved forwardly to the side of a trailer or other vehicle to be unloaded; the front jack legs 336 can be lowered to support the weight of the front of the forklift vehicle, and the fork carriage 26 can then be moved forwardly to engage and lift a load on the vehicle without fear of the forklift vehicle tipping. When the front legs 330 are used, the roller support system for the fork tines shown in FIG. 9, and the support posts 262 shown in FIG. 12, can be eliminated.

The rear legs 332 are useful when the vehicle is being raised above the ground on its forks 168, since they limit rearward tipping of the forklift vehicle. (The rear legs 332 thus serve as an alternative to the fork extenders 332.) The rear legs 332 are fitted with telescopic inner extensions 342 having three positions indicated by apertures 344 in legs 342. A bolt (not shown) is passed through an aperture 348 in the rear leg 332 and through the appropriate aperture 344 in its inner extension 342 to secure the inner extension 342 in a desired position. It will be noted that the inner extension 342 of the rear leg includes a fixed bottom plate 350 which is aligned in a forwardly and downwardly sloping plane, rather than being horizontal. This arrangement is so that when the vehicle tilts rearwardly and the rear bottom plate 350 engages the ground, it will do so in a horizontal position.

In some applications of the forklift vehicle, it will be desired to unload onto the ground the contents of the pallet carried by the vehicle. For example, when the vehicle is carrying pallets of sod to be laid on the ground, it may be desirable to unload all of the sod from a pallet, so that the pallet can then be removed without waiting for the pallet to be manually unloaded. Reference is therefore made to FIGS. 22 to 26, which show a modification which can be added to the forklift vehicle for power unloading of the pallet.

Figure 23:
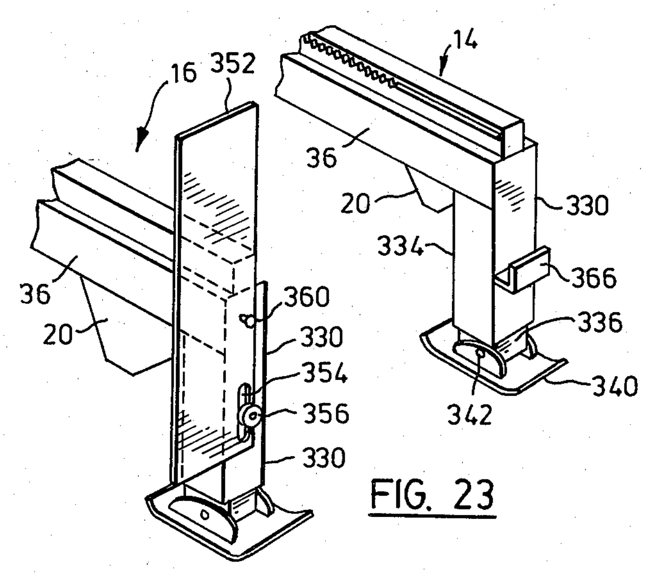
FIG. 23 is a perspective view of the front portion of the forklift vehicle showing the gate of FIG. 22.

As best shown in FIG. 23, one front leg 330 of the forklift is provided with a gate 352, which is simply a metal or wood plate. The gate 352 has a slot 354 therein and is pivotally mounted on the front leg 330 by a post 356 extending forwardly from the front leg, with an enlarged head to retain the gate on the post. The gate 352 is normally held in an upright position by a bolt 360 which extends through another hole in the gate 352 located above the slot 354 and then into a threaded hole 364 in the end plate of channel 36. When the bolt 360 is removed, the gate 352 may be pivoted clockwise as drawn so that its free end rests in an upwardly facing L-shaped holder 366 secured to the front surface of the other front leg 330.

Figure 24:
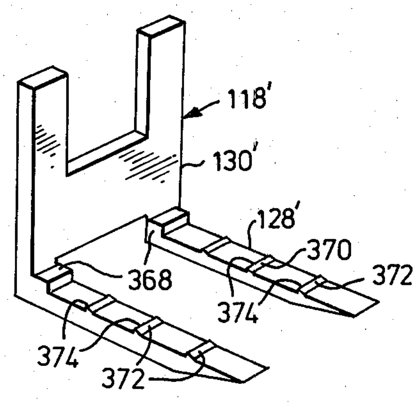
FIG. 24 is a perspective view of a modified fork for the forklift vehicle.
Figure 25:
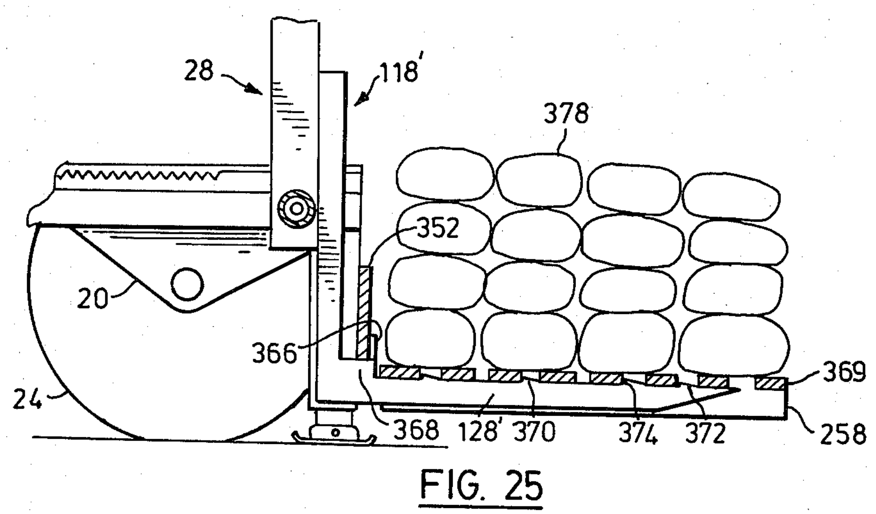
FIG. 25 is a side view of the forklift vehicle showing a pallet on the fork and the pallet contents about to be discharged.

The fork used with the gate 352 preferably has its tines and its back piece formed integrally and is indicated at 118' in FIG. 24, where primed reference numerals indicate parts corresponding to those of FIG. 2. The fork 118' includes a rear gate support 368 projecting above the upper surface of each tine 128' where the tine 128' meets the back piece 130'. The gate support 368 is of height slightly greater than the height of the upper boards 369 of a pallet 258, as shown in FIGS. 25 and 26. In addition each tine 128' includes a number of small serrations 370 formed on its upper surface and preferably of ramp form, having an upwardly and rearwardly sloping front surface 372 and a vertical rear surface 374.

The operation of the pallet unloading mechanism described is as follows. Firstly, the forks are operated to move the tines 128' into and then to lift the tines against the underside of the pallet 258 to be unloaded. At this time the serrations 370 dig into the underside of of the top boards 369 of the pallet. The fork carriage (not shown in FIGS. 25 and 26) is then moved to its forwardmost position, bringing the pallet 258 ahead of the front legs 330. (The front jack legs 336 are lowered prior to moving the fork carriage forwardly.) The gate 352 is then unlatched and lowered across the pallet 258 so that it rests on the gate support 368 on the fork tines. The height of the forks is adjusted so that the gate 352 is approximately horizontal at this time, with the free end of the gate in holder 366. The presence of the slot 354 in the gate 352 permits some tolerance in this adjustment.

The fork carriage 26 is then retracted rearwardly, as shown in FIG. 26. Rearward movement of the gate 352 is prevented by the front legs 330, and the gate 352 acts to force the contents of the pallet, here shown as rolls of sod 378, off the pallet and onto the ground. The serrations or barbs 370 on the tines prevent the pallet 258 from disengaging from the fork tines at this time.

After the contents of the pallet have been discharged, the pallet 258 can be moved to the desired position, at which time the forks are lowered slightly, disengaging the serrations or barbs 370 from the pallet. The fork tines 128' can then be removed from the pallet 258.

If desired, a hydraulic cylinder and piston and appropriate linkage may be provided to operate the gate 352 hydraulically.

An alternative gate structure for use in unloading the contents of a pallet is shown in FIGS. 27 and 28, where double primed reference numerals indicate parts corresponding to those of FIGS. 23 to 25. In the FIGS. 27 and 28 embodiment, the forks 118" are of hollow plate construction so that the back piece 130" has a hollow interior 380. A pair of posts 382 extend upwardly one from each side of the top of the back piece 130". Each post 382 has a gear wheel 384 pivotally mounted at its top. A shaft 386 extends crosswise between bushings 388 located in the bottom of each post 382, just above the top of the back piece 130". A gear 390 is fixed to the shaft 386 and is driven by another gear 392 of a hydraulic motor 394 fixed to the fork back piece 130" and supplied with hydraulic fluid through hoses not shown. Further gears 396 are fixed to the shaft 386 adjacent to each post 382 for rotation with the shaft 386. Two light chains 398 are stored in the hollow interior 380, one at each side of the fork back piece 130", and extend upwardly, over the gears 396, being held there against by idler gears 400 rotatably mounted on the posts 382. The chains 398 then extend upwardly to the gears 384 at the top of the posts 382, over gears 384, and then downwardly to support a gate 352" which extends across the forks 118".

The operation of the structure shown in FIGS. 27 and 28 is similar to that of the structure shown in FIGS. 23 to 26. Normally gate 152" is held out of the way, suspended above the fork back piece 130". When the contents of a pallet 258 are to be unloaded, the pallet is picked up on the fork tines 128" and the fork carriage is moved to its forwardmost position, bringing the gate 352" ahead of the front legs 330A, 330B. The hydraulic motor 394 is then operated, unwinding the chains 398 and lowering the gate 352" so that it rests on the gate support 368". The forks are lowered to the desired position and the fork carriage is then retracted. Rearward movement of the gate 352" is blocked by the front legs 330A, 330B, and as retraction of the fork carriage continues, the contents of the pallet are ejected from the pallet. Sufficient slack chain should be unwound from the chains 398 stored in the fork back piece 130" so that the gate 352" can move forwardly relative to the rearward movement of the forks 118" at this time. After the ejection process has been completed, the hydraulic motor 394 is operated to rewind the chains 392 and lift the gate 352 upwardly out of the way of a loaded pallet. The chains 398 simply coil in the interior space 380 of the fork back piece 130" at this time. The arrangement shown in FIGS. 27 and 28 has the advantage that the gate 352" is stored during non-use in a position where it does not interfere significantly with the carriage of the forklift vehicle on a trailer or other carrier vehicle and where it will interfere less with the view of the operator when he is operating the forklift vehicle. In addition, power operation of the gate 352" shown in FIGS. 27 and 28 is simplified as compared with that of the previously described gate 352. The gate 342" need not be wider than a pallet if there are stop plates on the legs 330 which can be swung inwardly to add to the effective width of the gate.

Instead of serrations 370 being provided on the fork tines 128", the fork tines may instead each be provided with a hook 402, as shown in FIGS. 29 and 30. As there shown, each hook 402 has a body 403 and a front barb 404 which extends upwardly from the body 403. The rear of the body 403 is pivoted at 405 to the tine 128 and has a band 406 of spring steel fixed thereto and extending rearwardly therefrom. The band 406 passes through a slotted pin 407 extending sideways from the tine 128, and is retained by a pin 408 through pin 407. The rear of the band 406 can be placed either in an upper or a lower notch 409A, 409B in a rear holder 410 fixed to the inside surface of the tine 128. When the band 406 is located in the upper notch 409A, this forces the barb 404 upwardly so that it projects for example about ¾ of an inch above the top surface of its tine. When the band 406 is in the lower notch 409B, this forces the barb 404 downwardly so that it does not project above the upper surface of its tine. The upwardly sloping lower surface 411 of the body 403 ensures that the body 403 will not project below the lower surface of the tine 128" at this time, thus facilitating entry or retraction of the tines into or from a pallet.

Figure 32:
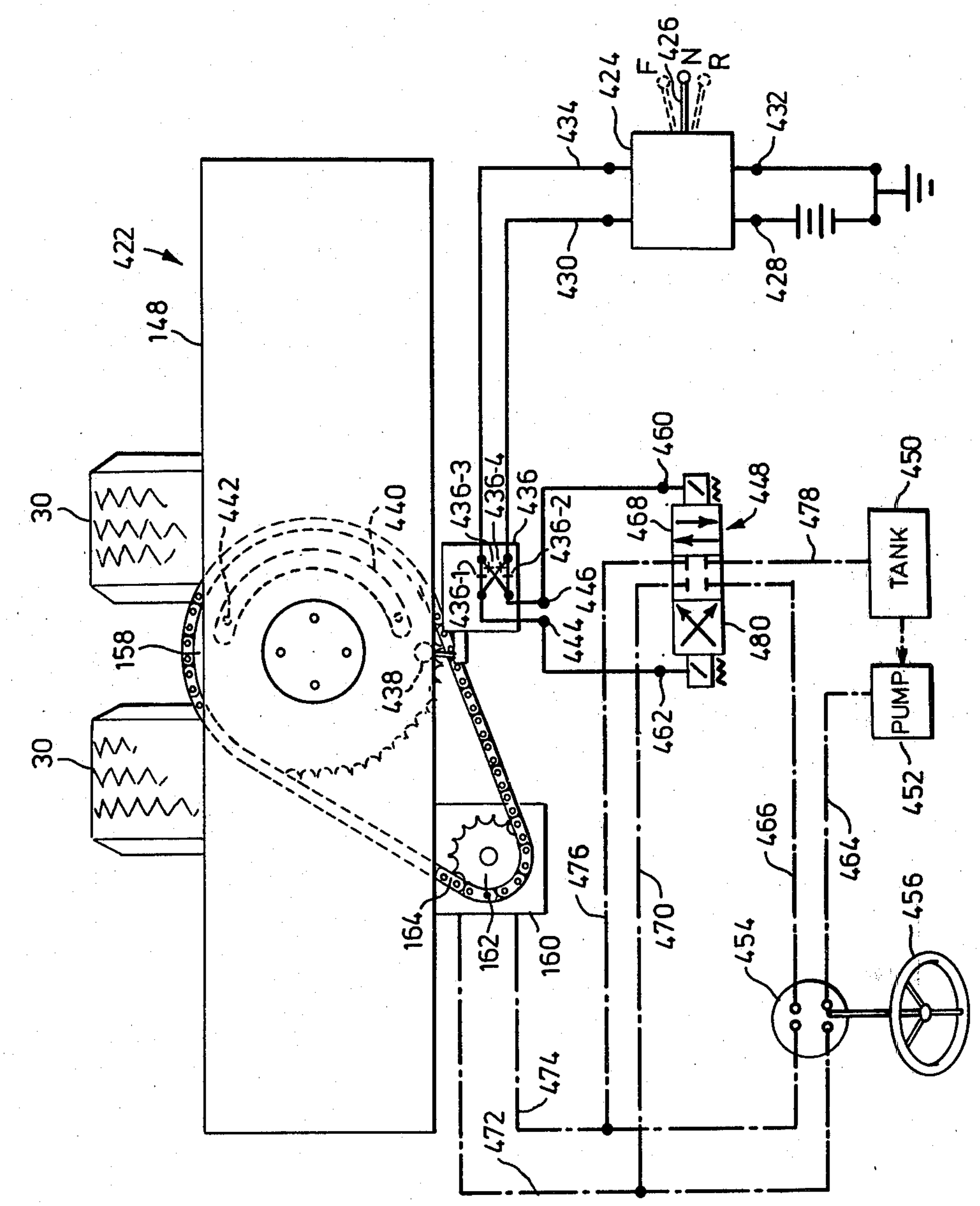
FIG. 32 is a plan view showing hydraulic and electric circuits for an automatic rear wheel centering mechanism according to the invention.

Reference is next made to FIGS. 31 to 33, which illustrate two forms of a centering system for the rear driving and steering wheels 30 of the forklift vehicle. As previously described, the forklift vehicle is both driven and steered by the rear wheels 30, and while this has substantial advantages, it can also cause certain difficulties. Firstly, the operator may not know, even when the wheels are oriented front and aft, whether they are in a position so that the vehicle will drive forwardly or rearwardly when he engages the clutch. This difficulty can also be dealt with by permitting the rear driving wheels 30 to rotate only through 180°, and providing a transmission which permits forward and reverse drive to the wheels. However such a transmission would add additional weight and cost to the vehicle. Secondly, the operator may not always know whether the wheels 30 are in fact pointed directly forwardly.

Both of the above difficulties can be dealt with by connecting a mechanical indicator to the steering sprocket 158. Such an arrangement is shown in FIG. 31, where a gear 412 is shown connected to sprocket 158 and to a gear box 413. The gear box 413 is mounted on the frame portion 148 and the gears in gear box 413 are selected so that the output of the gear box, transmitted by a speedometer cable 414, is exactly matched to the turns of steering sprocket 158. In other words, one 360° turn of steering sprocket 158 will produce one 360° turn of cable 414. Cable 414 is connected to the shaft 416 of a dial indicator diagrammatically indicated at 418. Since one turn of needle 420 corresponds exactly to one turn of steering sprocket 158, the dial indicator can be labelled "front" and "rear" to inform the operator both of the orientation of the rear wheels 30 and the direction in which they will drive.

Alternatively, an automatic centering system can be provided, so that when the operator pushes a lever, the rear wheels 30 will automatically return, via the shortest distance, to a centered position in which they will drive the vehicle either forwardly or rearwardly as selected by the operator. Such a system is shown at 442 in FIG. 32, where chain dotted lines indicate hydraulic lines and solid lines indicate electrical lines.

The centering system 422 includes an operator controlled switchbox 424 having a lever 426 spring biased to a neutral position N and which may be moved by the operator to a forward position F or a reverse position R. In its forward position F the lever 426 connects battery terminal 428 to wire 430 and ground terminal 432 to a second wire 434, while in its reverse position R the lever 426 reverses these connections. In its neutral condition N the lever opens the connections between wires 430, 435 and terminals 428, 432.

The wires 430, 434 extend to a double-pole double-throw limit switch 436. The switch 436 has four contacts, namely two normally open contacts 436-1, 436-2, and two normally closed contacts 436-3, 436-4. These contacts are indicated in detached contact notation in FIG. 32, normally open contacts being indicated by an x and normally closed contacts being indicated by a dash.

The limit switch 436, which can be a standard microswitch, has a cam follower 438 which rides on the outside surface of a semi-circular cam 440 mounted by two bolts 442 on the upper surface of the steering sprocket 158 (see also FIG. 33). When the cam follower 438 is on the cam 440, the limit switch 436 operates closing the normally open contacts 436-1, 436-2 and opening the normally closed contacts 436-3, 436-4.

The output terminals 44, 446 of the limit switch 436 are connected to opposite ends of a solenoid four way directional valve 448 which is connected into the power steering circuit for the forklift machine.

The power steering circuit for the forklift machine is standard, except for the directional valve 448, and includes a tank 450, and a pump 452 which supplies fluid to a conventional power steering valve 454 such as that sold under the trade mark "Orbitrol". The hydraulic hoses from the steering valve 454 extend in conventional manner to the hydraulic steering motor 160 and to the pump 452 and tank 450, so that the operation of the steering wheel 456 attached to the steering valve 454 will in conventional manner operate the steering motor 160 in the direction governed by the steering wheel 456.

The four way directional valve 448 is arranged as shown so that it will override the steering valve 456 and will operate the steering motor 160 directly when valve 448 is energized. Operation is as follows.

Normally the four way valve 448 is spring biased to its centre position, where it has no effect on the operation of motor 160. If now the lever 426 is moved to the forward position, this energizes the solenoid valve 448 to operate the hydraulic steering motor 160. The direction in which valve 448 and hence the motor 160 operates will depend on the condition of the limit switch 436. Assume that in the position drawn in FIG. 32, the wheels 30 will drive the vehicle forwardly, and assume further that the fronts of wheels 30 have then been shifted 90° counterclockwise from the position drawn, so that cam follower 438 is off the cam 440. Then, with lever 426 in position F, battery is connected from terminal 428 through wire 430, through contact 436-2, and through terminal 446 to terminal 460 of solenoid valve 448. Ground is similarly connected to terminal 462 of valve 448. This shifts the valve spool to the right as drawn. Hydraulic fluid then flows through hose 464, through the steering valve 454 (which is in centered position, allowing fluid to circulate freely therethrough), through hose 466, through valve spool portion 468, and through hoses 470, 472 to motor 160. The return path is through hoses 474, 476, valve spool system 468, and hose 478 to the tank 450. This drives hydraulic motor 160 and sprocket 158 clockwise to return the wheels 30 to centered and forward drive condition via the shortest route. Had the fronts of wheels 30 been shifted to the right, i.e. clockwise, from the position drawn, then cam follower 438 would have been on cam 440, reversing the polarity of the connections to valve 448. Hydraulic fluid would then have flowed through valve spool portion 480, reversing the flow of fluid to hydraulic motor 160 and rotating sprocket 158 counterclockwise, again returning the wheels 30 to centered and front driving condition via the shortest path.

When the wheels 30 are rotating (for example) clockwise toward centered position as described above, cam follower 438 is off cam 440. When the wheels 30 reach and pass centered position, cam follower 438 moves onto cam 440, reversing the connections in limit switch 436 and hence reversing the condition of the valve spool of valve 448. This reverses the steering motor 160 and the wheels 30 now begin to rotate counterclockwise. The result is that the wheels 30 then oscillate back and forth slightly as the cam follower 438 comes on and off the cam 440. The oscillation tells the operator that the center position has been reached and he releases the centering lever 426 which then returns to position N, terminating operation of the steering motor 160.

If the operator desires the wheels to be centered and to drive the vehicle rearwardly, then he moves the centering lever 426 to the position R, reversing the polarity of electrical feed to the limit switch 436. This reverses the entire operation so that the wheels 30 now rotate to a position in which they will drive the vehicle rearwardly when drive is applied to the wheels 30.

When the centering lever 426 is returned to neutral position, the four way directional valve 448 returns under spring bias to its center position as drawn, blocking fluid flow through hoses 470, 476.

It will be seen that whatever the position of the wheels 30, they will always turn 180° or less to the position selected by the operator, and will never be required to turn more than 180° to the selected position.

Although two rear driving and steering wheels have been shown, it will be appreciated that only one wheel may be used if desired, substantially preferably centered under the rear frame member.

It will be appreciated that various features of the invention, for example the clutch mechanism for permitting low speed creeping, may be used in material handling vehicles other than forklift vehicles.

It will also be appreciated that the fork carriage may be driven by means other than the rack system shown. For example it may be operated by a roller or belt drive, or by a hydraulic cylinder. However, the rack and hydraulic motor system is preferred because of its positive drive, long stroke and low weight and cost.

If desired, the vehicle drive may be electrical rather than gasoline or diesel. In addition, the drive shaft means 166 (FIG. 5) may be eliminated and replaced by a hydraulic motor located in the place of the differential 140. In addition, ordinary automobile-type steering may be used in that event. However the yoke 144 will still preferably be used, so that the space 184 therein will permit side to side tilting of the rear wheels.

If desired, the forklift vehicle may be supported on the rear of a carrier vehicle (such as a trailer) simply by providing beams which can be slidably extended rearwardly from the rear of the carrier vehicle under the frame members 14, 16 after the forklift vehicle has raised sufficiently on its forks. The forklift vehicle is then lowered onto these beams and is tied to them by chains. If desired pockets can be provided at the rear of the carrier vehicle for the fork times and which support the fork tines, to help position the forklift vehicle and to facilitate raising the carrier vehicle to a greater extent.

What we claim as our invention is:

1. A self propelled forklift vehicle comprising:

(a) a frame defining an elongated space open at one end thereof and extending to the ground, (b) wheels mounted on said frame for supporting and driving said vehicle, (c) a fork tower, and forks mounted on said fork tower, (d) means mounting said fork tower on said frame with said forks positioned in said space and for horizontal movement of said fork tower on said frame, (e) power means connected between said fork tower and said frame and operable for moving said fork tower on said frame to move said forks horizontally through said space, (f) means connected between said fork tower and said forks for raising and lowering said forks and for driving said forks substantially below the level of the bottoms of said wheels, whereby to raise said vehicle above the ground on said forks, so that said vehicle can be moved by driving said forks below the bottoms of said wheels and then operating said power means to produce relative movement between said fork tower and said frame while said vehicle is thus raised.

2. A forklift vehicle according to claim 1 in combination with a carrier vehicle, said carrier vehicle including clamping means mounted on said carrier vehicle for clamping said frame to said carrier vehicle.

3. A self propelled forklift vehicle in combination with a carrier vehicle, said forklift vehicle comprising:

(a) a frame comprising a pair of parallel longitudinally extending frame members parallel to each other and spaced laterally apart, (b) wheels mounted on said frame for supporting and driving said vehicle, said wheels including a pair of front wheels one mounted on each of said frame members, (c) a fork tower mounted on said frame between said frame members, and forks mounted on said fork tower, (d) means connected between said fork tower and said forks for raising and lowering said forks and for driving said forks substantially below the level of the bottoms of said wheels, whereby to raise said vehicle above the ground, and said carrier vehicle including:

(e) retaining means mounted for supporting said frame members on said carrier vehicle, (f) a pair of wheel retaining means fixed to said carrier vehicle, each wheel retaining means being adapted to engage at least a portion of said front wheel when said forklift vehicle is secured to said carrier vehicle to assist in locating and holding said forklift vehicle relative to said carrier vehicle.

4. A self propelled forklift vehicle adapted for travel over the ground along a forward and rearward path of travel and comprising:

(a) a frame having a pair of longitudinal parallel frame members spaced laterally apart and extending along said path of travel and defining a space therebetween, said space being elongated in the direction of said path of travel and being open at the front ends of said frame members and extending to said ground, (b) two front wheels, one connected to the outside of each frame member near the front thereof, (c) rear wheel means connected to said frame members, (d) a fork carriage extending across said space and mounted on said frame members for movement forwardly and rearwardly along said frame members, (e) a fork tower mounted on said fork carriage, said fork tower having forwardly facing forks mounted thereon, said forks being positioned in said space, (f) power means connected to said fork carriage and to said frame members for moving said fork carriage forwardly and rearwardly along said frame members to move said forks forwardly and rearwardly through said space, (g) said fork tower including means for raising and lowering said forks, and for driving said forks substantially below the bottoms of said wheels and said wheel means, whereby to raise said vehicle above the ground on said forks, so that said vehicle can be moved by driving said forks below the bottoms of said wheels and said wheel means and then operating said power means to produce relative movement along said path of travel between said fork carriage and said frame member while said vehicle is thus raised.

5. A forklift vehicle according to claim 4 in combination with a carrying vehicle, said carrying vehicle including retaining means for supporting each of said frame members on said carrying vehicle.

6. A forklift vehicle according to claim 4 including means mounting said fork tower for lateral movement on said fork carriage, and second power means connected between said fork carriage and said fork tower for moving said fork tower laterally on said fork carriage, whereby said vehicle can be shifted laterally by operating said first mentioned power means to drive said forks below the bottoms of said wheels and wheel means to raise said vehicle above the ground on said forks, and then operating said second power means to produce relative lateral movement between said fork tower and said fork carriage.

7. A forklift vehicle according to claim 1 wherein said means (d) includes means mounting said fork tower for lateral movement of said fork tower on said frame, and second power means connected between said fork tower and said frame for moving said fork tower laterally on said frame, whereby said vehicle can be shifted laterally by operating said first mentioned power means to drive said forks below the bottoms of said wheels to raise said vehicle above the ground on said forks, and then operating said second power means to produce relative lateral movement between said fork tower and said frame.

8. A self propelled forklift vehicle adapted for travel along a forward and rearward path of travel and comprising:

(a) a frame having a pair of longitudinal parallel frame members spaced laterally apart and extending along said path of travel and defining a space therebetween, said space being open at the front ends of said frame members,
(b) two front wheels, one connected to the outside of each frame member near the front thereof,
(c) rear wheel means connected to said frame members,
(d) a fork carriage extending across said space and mounted on said frame members for movement forwardly and rearwardly along said frame members,
(e) a fork tower mounted on said fork carriage, said fork tower having forwardly facing forks mounted thereon, said fork tower including means for raising and lowering said forks, and for driving said forks substantially below the bottoms of said wheels and said wheel means, whereby to raise said vehicle above the ground,
(f) power means connected to said fork carriage and to said frame members for moving said fork carriage forwardly and rearwardly along said frame members,
(g) each frame member including a set of rack teeth, and said power means including a drive gear mounted on said fork carriage and engaging said rack teeth, and motor means connected to said fork carriage for rotating said drive gear,
(h) said rack teeth facing downwardly, said motor means being a hydraulic motor having a drive sprocket, said power means including a second drive sprocket connected to said drive gear, a chain extending between said drive sprockets, and enclosure means enclosing said drive sprockets and chain.

9. A self propelled forklift vehicle adapted for travel along a forward and rearward path of travel and comprising:

(a) a frame having a pair of longitudinal parallel frame members spaced laterally apart and extending along said path of travel and defining a space therebetween, said space being open at the front ends of said frame members,
(b) two front wheels, one connected to the outside of each frame member near the front thereof,
(c) rear wheel means connected to said frame members,
(d) a fork carriage extending across said space and mounted on said frame members for movement forwardly and rearwardly along said frame members,
(e) a fork tower mounted on said fork carriage, said fork tower having forwardly facing forks mounted thereon, said fork tower including means for raising and lowering said forks, and for driving said forks substantially below the bottoms of said wheels and said wheel means, whereby to raise said vehicle above the ground, (f) power means connected to said fork carriage and to said frame members for moving said fork carriage forwardly and rearwardly along said frame members,
(g) each frame member including a set of rack teeth, and said power means including a drive gear mounted on said fork carriage and engaging said rack teeth, and motor means connected to said fork carriage for rotating said drive gear,
(h) said fork carriage including a transverse member extending laterally between said frame members, and two carriage side members one secured to each end of said transverse member, and said fork tower including a drive shaft extending through said transverse member, a said drive gear connected to each end of said drive shaft, each drive gear being in engagement with a set of said rack teeth, chain and sprocket means connected to said drive shaft for rotating said drive shaft and motor connected to said chain and sprocket means.

10. A vehicle according to claim 9 wherein each of said drive gears, and said chain and sprocket means, are enclosed within a said carriage side member to protect said chain and sprocket means and said gears from dirt, stones and the like.

11. A vehicle according to claim 9 wherein said fork tower is movably mounted on said transverse member for pivotal movement thereon in an arc extending forwardly and rearwardly, and piston and cylinder means are connected between at least one said carriage side member and said tower to move said tower in said arc.

12. A vehicle according to claim 10 and including piston and cylinder means connected between a said carriage side member and said tower to move said tower laterally on said transverse member.

13. A self propelled forklift vehicle adapted for travel along a forward and rearward path of travel and comprising:

(a) a frame having a pair of longitudinal parallel frame members spaced laterally apart and extending along said path of travel and defining a space therebetween, said space being open at the front ends of said frame members,
(b) two front wheels, one connected to the outside of each frame member near the front thereof,
(c) rear wheel means connected to said frame members,
(d) a fork carriage extending across said space and mounted on said frame members for movement forwardly and rearwardly along said frame members,
(e) a fork tower mounted on said fork carriage, said fork tower having forwardly facing forks mounted thereon, said fork tower including means for raising and lowering said forks, and for driving said forks substantially below the bottoms of said wheels and said wheel means, whereby to raise said vehicle above the ground, (f) power means connected to said fork carriage and to said frame members for moving said fork carriage forwardly and rearwardly along said frame members, (g) each frame member including a set of rack teeth, and said power means including a drive gear mounted on said fork carriage and engaging said rack teeth, and motor means connected to said fork carriage for rotating said drive gear, (h) each said side frame member comprising a lower box-shaped channel and an upper U-shaped channel, each said U-shaped channel having a central connecting portion oriented vertically and having a pair of legs oriented horizontally, one above the other and extending inwardly, the lower of said legs forming an integral portion of the top of said box-shaped channel, said rack teeth being located adjacent the tip of the upper of said legs.

14. A self propelled forklift vehicle adapted for travel along a forward and rearward path of travel and comprising:

(a) a frame having a pair of longitudinal parallel frame members spaced laterally apart and extending along said path of travel and defining a space therebetween, said space being open at the front ends of said frame members, (b) two front wheels, one connected to the outside of each frame member near the front thereof, (c) rear wheel means connected to said frame members, (d) a fork carriage extending across said space and mounted on said frame members for movement forwardly and rearwardly along said frame members, (e) a fork tower mounted on said fork carriage, said fork tower having forwardly facing forks mounted thereon, said fork tower including means for raising and lowering said forks, and for driving said forks substantially below the bottoms of said wheels and said wheel means, whereby to raise said vehicle above the ground, (f) power means connected to said fork carriage and to said frame members for moving said fork carriage forwardly and rearwardly along said frame members, (g) a gate, means mounted on said vehicle for selectively supporting said gate transversely across said forks and adjacent the front ends of said longitudinal frame members, and blocking means coupled to said longitudinal frame members adjacent the front ends thereof for blocking rear movement of said gate when said gate is located transversely across said forks so that when said fork carriage is moved rearwardly, said gate will block movement of the contents of the pallet located on said forks, thereby effecting discharge of said contents from said pallet.

15. A self propelled forklift vehicle according to claim 14 wherein said forks include tines having retaining means thereon to prevent movement of said pallet off said forks during ejection of the contents of said pallet.

16. A vehicle according to claim 15 and including a pair of front legs, one leg connected to the front of each longitudinal frame member and extending downwardly therefrom, each leg including a telescopic foot therein, and means for lowering said foot to support the front of said vehicle, whereby to stabilize said vehicle when said fork carriage is moved forwardly toward the fronts of said frame members, said legs also comprising said blocking means.

17. A vehicle comprising:

(a) A pair of forks facing in a predetermined direction for supporting a pallet, (b) a frame, (c) a fork carriage, (d) means mounting said fork carriage on said frame for movement back and forth in said direction between an extended outer position and a retracted inner position, (e) means mounting said forks in said fork carriage and for raising and lowering said forks, (f) stop means mounted on said frame in a position such that when said forks are in said extended position a pallet supported thereon is located outwardly of said stop means and such that said forks may be withdrawn inwardly of said stop means, (g) gate means, (h) and means for supporting said gate means outwardly of said stop means and extending across said forks, so that when said gate means is located between the contents of a pallet on said forks and said stop means and then said fork carriage is withdrawn inwardly, movement of said gate inwardly will be prevented by said stop means and said gate means will act to discharge the contents of said pallet onto the ground.

18. A forklift vehicle according to claim 17 wherein said forks include horizontally extending tines and a back member, and a gate support member on said tines adjacent said back member, said gate support member being of height slightly greater than the height of that portion of a said pallet projecting above said tines to support said gate member above the top of a said pallet.

19. A forklift vehicle according to claim 17 wherein said forks include horizontally extending tines, said tines including retaining means for resisting movement of a pallet off said tines when said pallet is supported by said tines.

20. A self propelled forklift vehicle comprising:

(a) a frame having a pair of parallel frame members spaced apart and defining a space therebetween for receiving a pallet, said space having an open front end, bounded by the fronts of said frame members, (b) a fork carriage extending across said space and mounted on said frame members for movement along said frame members, (c) a fork tower mounted on said fork carriage, said fork tower having forks mounted thereon and facing said open end of said open end of said space to support said pallet, said fork tower including means for raising and lowering said forks, (d) power means connected to said fork carriage and to said frame members for moving said fork carriage along said frame members, towards and away from said open end, (e) a pair of stops coupled to said frame members adjacent the fronts thereof, (f) a gate, (g) and means for supporting said gate in front of said stops and extending across said forks, so that when said gate is located between the contents of a pallet on said forks and said stops and then said fork carriage is withdrawn rearwardly into said space, movement of said gate rearwardly will be prevented by said stops and said gate will act to discharge the contents of said pallet onto the ground.

21. A forklift vehicle according to claim 20 wherein said forks include horizontally extending tines and a back member, and a gate support member on said tines adjacent said back member, said gate support member being of height slightly greater than the height of that portion of a said pallet projecting above said tines to support said gate member above the top of a said pallet.

22. A forklift vehicle according to claim 21 wherein said back member includes a pair of posts extending upwardly therefrom, one at each side thereof, and flexible support means extending upwardly over said posts and downwardly therefrom, said gate being suspended from said flexible support means, and power means connected to said forks for raising and lowering said gate by winding and unwinding said flexible support means.

23. A forklift vehicle according to claim 22 wherein said flexible support means at each side of said back member comprises a chain, said back member being of hollow construction and said chain having slack portions stored within said back member.

24. A forklift vehicle according to claim 20 wherein said forks include horizontally extending tines, said tines including retaining means for resisting movement of a pallet off said tines when said pallet is supported by said tines.

25. A forklift vehicle according to claim 20 and including means pivotally connecting said gate to one of said stops.

26. A vehicle according to claim 20 and including a pair of front legs, one leg connected to the front of each frame member and extending downwardly therefrom, each leg including a telescopic foot therein, and means for lowering said foot to support the front ends of frame members, said legs also comprising said stops.

27. A self propelled forklift vehicle comprising:

(a) a frame, a fork tower mounted on said frame, and forks mounted on said fork tower,
(b) front wheels connected to said frame adjacent the front thereof to support the front of said frame for movement longitudinally along a path of travel,
(c) a yoke connected to said frame adjacent the rear of said frame, said yoke having a pair of downwardly extending side members spaced apart along said path of travel and having an open lower end,
(d) a pair of rear wheels, axle means supporting said wheels for rotation about a substantially horizontal transverse first axis, and holder means supporting and retaining said axle means,
(e) said holder means being pivotally connected to said side members of said yoke at said open lower end thereof for pivotal side to side tilting of said wheels about a substantially horizontal second axis located at right angles to said first axis,
(f) power means connected to said wheels for driving said wheels,
(g) and steering means connected to said frame for steering said wheels.

28. A self propelled forklift vehicle adapted for travel along a forward and rearward path of travel and comprising:

(a) a frame having a pair of longitudinal parallel frame members spaced laterally apart and extending along said path of travel and defining a space therebetween, said space being open at the front ends of said frame members,
(b) two front wheels, one connected to the outside of each frame member near the front thereof,
(c) rear wheel means connected to said frame members,
(d) a fork carriage extending across said space and mounted on said frame members for movement forwardly and rearwardly along said frame members,
(e) a fork tower mounted on said fork carriage, said fork tower having forwardly facing forks mounted thereon, said fork tower including means for raising and lowering said forks,
(f) power means connected to said fork carriage and to said frame members for moving said fork carriage forwardly and rearwardly along said frame members,
(g) a set of downwardly facing rack teeth mounted on each frame member,
(h) said power means including a drive gear mounted on said fork carriage and engaging said rack teeth, and motor means connected to said fork carriage for rotating said drive gear,
(i) said motor means being a hydraulic motor having a drive sprocket, said power means including a second drive sprocket connected to said drive gear, a chain extending between said drive sprockets, and enclosure means enclosing said drive sprockets and chain.

29. A vehicle according to claim 28 wherein said fork carriage includes a transverse member extending laterally between said frame members, and two carriage side members one secured to each end of said transverse member, and said fork tower includes a drive shaft extending through said transverse member, a said drive gear connected to each end of said drive shaft, each drive gear being in engagement with a set of said rack teeth, chain and sprocket means connected to said drive shaft for rotating said drive shaft, and a motor connected to said chain and sprocket means.

30. A vehicle according to claim 29 wherein each of said drive gears, and said chain and sprocket means, are enclosed within a said carriage side member to protect said chain and sprocket means and said gears from dirt, stones and the like.

31. A vehicle according to claim 30 wherein said fork tower is movably mounted on said transverse member for pivotal movement thereon in an arc extending forwardly and rearwardly, and piston and cylinder means are connected between at least one said carriage side member and said tower to move said tower in said arc.

32. A vehicle according to claim 30 and including piston and cylinder means connected between a said carriage side member and said tower to move said tower laterally on said transverse member.

33. A vehicle comprising: a pair of forks facing outwardly for supporting a loaded pellet, said pallet being of predetermined length, said forks including retaining means for resisting movement of said pallet outwardly off said forks when said pallet is supported by said forks, means for moving said forks in a substantially horizontal plane inwardly and outwardly over a distance at least equal to said predetermined length, between an extended outer position and a retracted inner position, gate means movable between a first fixed position in which said gate means is located just above said pallet when said forks are in said extended position and blocks the contents of said pallet but not said pallet from moving inwardly and a second position in which said gate means does not obstruct movement of said pallet and its contents inwardly or outwardly, means for selectively moving said gate means between said first and second positions, and means operable for withdrawing inwardly said forks, with said pallet retained thereon, from said extended position to said retracted position while said gate means is in said first fixed position so that said contents of said pallet are blocked by said gate means from moving inwardly, thereby fully removing said pallet from beneath said contents and hence fully discharging said contents from said pallet.

34. A method of discharging the contents of a loaded pallet supported on a pair of forwardly facing forks of a forklift vehicle, comprising:

(a) retaining said pallet on said forks against movement of said pallet forwardly off said forks, (b) moving a gate which is movable relative to said pallet into a position the rear end of said pallet and just above said pallet in which said gate blocks the contents of said pallet from moving rearwardly, and, (c) then withdrawing said forks, while retaining said pallet in fixed position thereon, rearwardly in a substantially horizontal plane over a distance equal at least to the length of said pallet while holding said gate stationary in said position so that said gate blocks movement of said contents rearwardly, thereby fully removing said pallet from beneath said contents and hency fully discharging said contents from said pallet.

35. A forklift vehicle comprising:

(a) a body, (b) a pair of forks for supporting a loaded pallet, said pallet being of predetermined length, (c) said forks including retaining means for resisting movement of said pallet outwardly off said forks when said pallet is supported by said forks, (d) means mounting said forks on said body for movement of said forks in a substantially horizontal plane, over a distance at least equal to said predetermined length, between an extended outer position and a retracted inner position, (e) gate means, (f) means for supporting said gate means in a position in which said gate means is located just above and inwardly of said pallet when said forks are in said extended position and in which said gate means blocks the contents of said pallet but not said pallet from moving towards said retracted position, (g) said body and said gate means including cooperating stop means operable for preventing movement of said gate means inwardly when said gate means is in said position, so that when said gate means is located in said position and said forks are withdrawn inwardly to said retracted position with said pallet retained thereon, movement of said gate means inwardly will be prevented and said gate means will act to fully discharge the contents of said pallet.

* * * * *